(12) United States Patent
Pinheiro et al.

(10) Patent No.: US 9,775,011 B2
(45) Date of Patent: Sep. 26, 2017

(54) IMPLEMENTATIONS OF APPLICATION SPECIFIC ACCESS CLASS BARRING SKIP FUNCTIONALITY IN A WIRELESS NETWORK

(71) Applicant: Intel IP Corporation, Santa Clara, CA (US)

(72) Inventors: Ana Lucia Pinheiro, Breinigsville, PA (US); Marta Martinez Tarradell, Hillsboro, OR (US); Robert Zaus, Munich (DE); Jerome Parron, Fuerth (DE); Hyung-Nam Choi, Hamburg (DE); Richard Burbidge, Shrivenham (GB); Vivek G. Gupta, San Jose, CA (US); Chen-Ho Chin, Deerlijk (BE)

(73) Assignee: Intel Corporation, Santa Clara, CA (US)

( * ) Notice: Subject to any disclaimer, the term of this patent is extended or adjusted under 35 U.S.C. 154(b) by 238 days.

(21) Appl. No.: 14/583,221

(22) Filed: Dec. 26, 2014

(65) Prior Publication Data

US 2015/0223146 A1 Aug. 6, 2015

Related U.S. Application Data

(60) Provisional application No. 61/933,880, filed on Jan. 31, 2014, provisional application No. 61/953,669, filed on Mar. 14, 2014.

(51) Int. Cl.
*H04W 4/14* (2009.01)
*H04W 48/02* (2009.01)
*H04W 48/12* (2009.01)

(52) U.S. Cl.
CPC ............ *H04W 4/14* (2013.01); *H04W 48/02* (2013.01); *H04W 48/12* (2013.01)

(58) Field of Classification Search
CPC ........ H04W 4/14; H04W 48/02; H04W 48/12
See application file for complete search history.

(56) References Cited

U.S. PATENT DOCUMENTS

2010/0182971 A1 7/2010 Chin
2012/0244828 A1 9/2012 Tiwari
(Continued)

FOREIGN PATENT DOCUMENTS

WO WO 2013/022298 A2 2/2013
WO 2013168700 A1 11/2013

OTHER PUBLICATIONS

Wikipedia, "AT (unix)," Oct. 20, 2013, Wikipedia, all pages.*
(Continued)

*Primary Examiner* — Curtis A Alia
(74) *Attorney, Agent, or Firm* — Ledell Ansari LLP

(57) ABSTRACT

User Equipment (UE) may skip the Access Class Barring (ACB) procedure for specific services, such as MMTEL voice, MMTEL video, and SMS. In one implementation, NAS layer of a UE may: receive, from an upper layer relative to the NAS layer, a request for a particular service type that is being originated by the UE; receive an indication, from a Radio Resource Control (RRC) layer of the UE, that access to a cell, associated with the UE, is barred; and bypass the indication that access to the cell is barred, when the particular service type matches a predetermined set of service types. The bypassing may include: requesting that the RRC layer establish an RRC connection for the service request, and notifying the RRC layer that the request for the RRC connection corresponds to the particular service type.

22 Claims, 17 Drawing Sheets

(56) References Cited

U.S. PATENT DOCUMENTS

2012/0269099 A1 10/2012 Chin et al.
2013/0268604 A1* 10/2013 Gupta ................. H04L 27/2657
 709/206
2013/0294396 A1* 11/2013 Iwamura ............... H04W 72/04
 370/329
2015/0111556 A1 4/2015 Hapsari et al.

OTHER PUBLICATIONS

International Search Report and Written Opinion for PCT/US2015/013348; May 7, 2015.
Search Report, Translation of Search Report, and Translation of Corresponding Office Action of corresponding Taiwan Application 104102885 with mailing date of Mar. 8, 2016.
3rd Generation Partnership Project (3GGP), Technical Specification Group Core Network and Terminals, Non-Access-Stratum (NAS) protocol for Evolved Packet System (EPS), Stage 3 (Release 12); Dec. 2013; 3GPP TS 24.301.
3rd Generation Partnership Project, Technical Specification Group Radio Access Network, Evolved Universal Terrestrial Radio Access (E-UTRA), Radio Resource Control (RRC), Protocol specification (Release 12); Dec. 2013; 3GPP TS 36.331.
3rd Generation Partnership Project, Technical Specification Group Radio Access Network, Evolved Universal Terrestrial Radio Access (E-UTRA), Study on Smart Congestion Mitigation in E-UTRAN (Release 12); Feb. 2014; 3GPP TS 36.848.
"Details of bypassing ACB solution for SCM"; 3GPP TSG-RAN WG2 #85; Prague, Czech Republic, Feb. 10-14, 2014; Tdoc R2-140638.
Change Request 0202, 22.011; 3GPP TSG-SA WG1 Meeting #65; Taipei, Taiwan, Jan. 20-24, 2014; S1-140154.
Change Request 0198, 22.011; 3GPP TSG-SA WG1 Meeting #65; Taipei, Taiwan, Jan. 20-24, 2014; S1-140329.

* cited by examiner

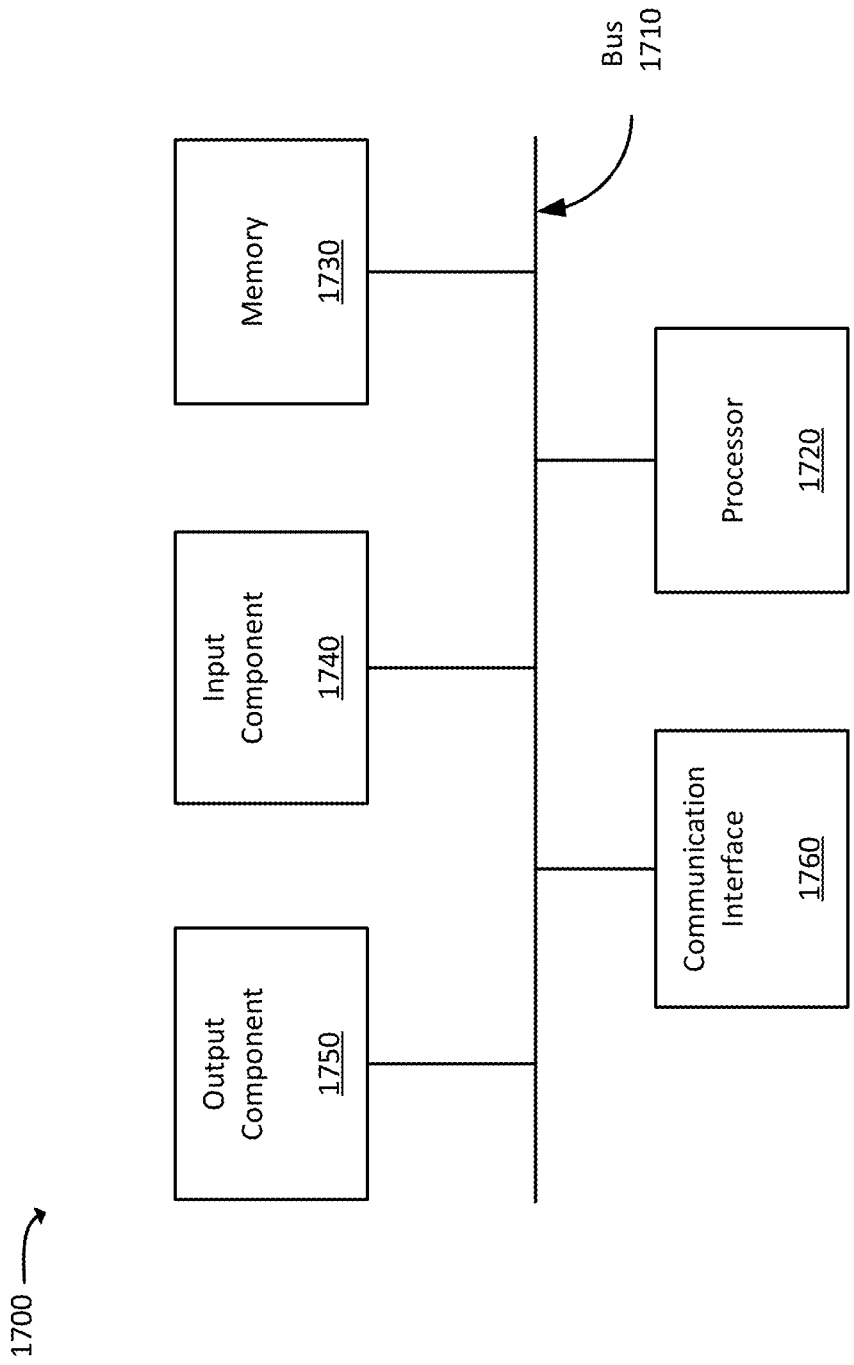

IMPLEMENTATIONS OF APPLICATION SPECIFIC ACCESS CLASS BARRING SKIP FUNCTIONALITY IN A WIRELESS NETWORK

RELATED APPLICATIONS

The present application claims the benefit of U.S. Provisional Patent Application No. 61/933,880, which was filed on Jan. 31, 2014, and U.S. Provisional Patent Application No. 61/953,669, which was filed on Mar. 14, 2014, both of which are hereby incorporated by reference as though fully set forth herein.

BACKGROUND

Due to the rapid increase of smartphone usage, even during normal operation, wireless network operators can face problems in coping with the high load of signaling and user traffic. This problem can become more significant during occurrences of disaster and/or public festivities such as new year events, sports matches, etc., when user-generated and/or application-generated network usage can be concentrated during a certain time and/or area, potentially causing congestion in the Radio Access Network (RAN) and/or the core network (CN).

In network congestion situations, a network operator may want to prioritize emergency access or high priority access over other access types, prioritize Radio Resource Control (RRC)/Non Access Stratum (NAS) messages over normal data, and/or prioritize voice services over non-voice services. One potential solution to prioritizing traffic is based on configuring User Equipment devices (UEs) in idle mode to skip Access Class Barring (ACB) procedures for certain applications, such as Multimedia Telephony (MMTel) voice, MMTel video, and Short Message Service (SMS) (e.g., MMTel SMS, SMS over SGs, and SMS over S102).

ACB, as implemented in the 3rd Generation Partnership Project (3GPP) standards, is a technique by which network operators can manage network congestion, such as congestion caused by an emergency situation in which an extraordinary number of communication sessions (e.g., telephone calls) are concurrently attempted in the network. ACB is a solution that may allow public safety (PS) personnel, such as emergency responders, as well as general emergency calls to public-safety answering points (PSAPs) to have priority on the network.

In ACB, each UE may be assigned to have a membership of one out of ten randomly allocated mobile populations, defined as Access Classes (AC) 0 to 9. The access class, of a particular UE, may be stored by the UE. In addition, UEs may be members of one or more out of five special categories (Access Classes 11 to 15). The five special categories may be allocated to specific high priority users as follows: Class 15—Public Land Mobile Network (PLMN) staff; Class 14—Emergency Services; Class 13—Public Utilities; Class 12—Security Services; and Class 11—PLMN use.

In case of an overload situation, such as an emergency situation that creates congestion, the network operator may choose to use ACB to reduce access to the network. The network operator may broadcast a message that indicates which access classes are barred. UEs that are not a member of a permitted access class may block or otherwise not permit certain communications over the network. In some situations, such as non-emergency (normal) congestion situations, network operators may use ACB to control congestion, such as by setting an access class barring rate and/or barring time. Additionally, barring parameters, relating to ACB, may potentially be configured independently for mobile originating data and mobile originating signaling attempts.

BRIEF DESCRIPTION OF THE DRAWINGS

Embodiments of the present invention will be readily understood by the following detailed description in conjunction with the accompanying drawings. To facilitate this description, like reference numerals may designate like structural elements. Embodiments of the invention are illustrated by way of example and not by way of limitation in the figures of the accompanying drawings.

FIG. 17 is a diagram of example components of a device.

DETAILED DESCRIPTION OF PREFERRED EMBODIMENTS

Figure 1:
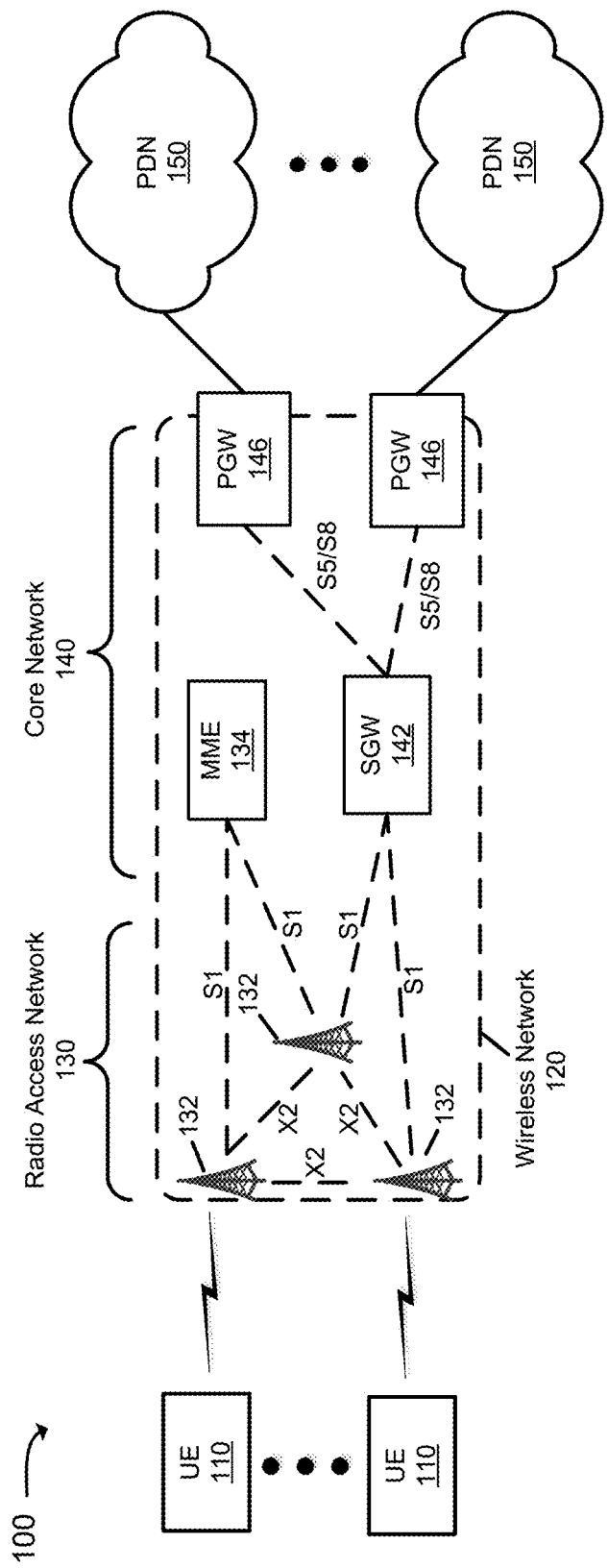
FIG. 1 is a diagram of an example environment in which systems and/or methods described herein may be implemented.

The following detailed description refers to the accompanying drawings. The same reference numbers in different drawings may identify the same or similar elements. It is to be understood that other embodiments may be utilized and structural or logical changes may be made without departing from the scope of the present disclosure. Therefore, the following detailed description is not to be taken in a limiting sense, and the scope of embodiments in accordance with the present invention is defined by the appended claims and their equivalents.

The description herein relates to techniques by which a network may indicate whether a UE skips the Access Class Barring (ACB) procedure in wireless networks, such as Long Term Evolution (LTE) networks or other networks. The functionality relating to skipping of ACB may be referred to as "ACB skipping," "ACB skip functionality," "bypass ACB," or other terminology by which access to a cell is considered to not be barred. ACB skipping may be performed for specific services, such as MMTEL voice, MMTEL video, and SMS. Notifications relating to ACB skipping may be transmitted to UEs, via a broadcast channel, in order to reach UEs in idle mode.

In some situations, it may be desirable for a network operator to prioritize emergency access and high priority network accesses over other network accesses, to prioritize RRC/NAS messages over normal data, and/or to prioritize voice services over other data. Consistent with aspects described herein, techniques will be described to implement prioritization of network traffic based on a UE ignoring or skipping normal network ACB procedures (ACB skipping) for certain applications or services (i.e., on a per-application/service basis).

One implementation described herein may include User Equipment (UE) comprising processing circuitry to implement a Non Access Stratum (NAS) layer to: receive, from an upper layer relative to the NAS layer, a request for transmission, for a particular service type, that is originated by the UE; receive an indication, from a Radio Resource Control (RRC) layer of the UE, that access to a cell, associated with the UE, is barred; and bypass the indication that the access to the cell is barred, when the particular service type matches a predetermined set of service types. The bypassing may include requesting that the RRC layer establish an RRC connection for the service request, and notifying the RRC layer that the request to establish the RRC connection corresponds to the particular service type. The request for transmission may include an Internet Protocol Multimedia (IMS) request or a Short Message Service (SMS) request.

The UE may further comprise processing circuitry to implement the RRC layer to: receive an indication, from a network, relating to a state of skipping of access class barring; and establish the RRC connection, based on the request from the NAS layer, when the state of the skipping of access class barring indicates that skipping of access class barring is active for the particular service type. The RRC layer may be further to bar the establishment of the RRC connection when the state of the ACB skipping indicates that ACB skipping is not active for the particular service type.

The predetermined set of service types may include at least one of: Multimedia Telephony (MMTel) video, MMTel voice, MMTel Short Message Service (SMS), and SMS over an SG or S102 interface.

Further, the indication, from the network, relating to the state of the skipping of access class barring, may include a System Information Block Type 2 (SIB2) message that includes one or more fields to indicate the access class barring skipping state for various services.

In yet another implementation, a method may include receiving, by UE and from a network, an Access Class Barring (ACB) indication that a cell is barred due to congestion; receiving, by a RRC layer of the UE and from the network, an indication that ACB should be bypassed for one or more particular services that are originated by the UE; providing, to a NAS layer of the UE and from an application layer of the UE, identification of a service that is being originated by the UE; receiving, by the RRC layer and from the NAS layer, a request for the establishment of a radio connection for the service; receiving, by the RRC layer, the provided identification of the service; and establishing, by the RRC layer and with the network, the radio connection for the service, despite the indication of ACB, when the identification of the service, as received by the RRC layer, matches the one or more particular services associated with the indication that ACB should be bypassed.

In another implementation, a UE may comprise a non-transitory memory device storing a plurality of processor-executable instructions; and a processor configured to execute the processor-executable instructions. Executing the processor-executable instructions causes the processor to: receive, from a cellular network, an ACB indication that a cell is barred due to congestion; receive, by a RRC layer of the UE and from the network, an indication that ACB should be bypassed for one or more particular services that are originated by the UE; provide, to a NAS layer of the UE and from an application layer of the UE, identification of a service that is being originated by the UE; receive, by the RRC layer and from the NAS layer, a request for the establishment of a radio connection for the service; receive, by the RRC layer, the provided identification of the service; and establish, by the RRC layer and with the network, the radio connection for the service, when the identification of the service, as received by the RRC layer, matches the one or more particular services associated with the indication that ACB should be bypassed.

In another implementation, UE may include means for receiving, from a cellular network, an ACB indication that a cell is barred due to congestion; means for receiving, by a RRC layer of the UE and from the network, an indication that ACB should be bypassed for one or more particular services that are originated by the UE; means for providing, to a NAS layer of the UE and from an application layer of the UE, identification of a service that is being originated by the UE; means for receiving, by the RRC layer and from the NAS layer, a request for the establishment of a radio connection for the service; means for receiving, by the RRC layer, the provided identification of the service; and means for establishing, by the RRC layer and with the network, the radio connection for the service, when the identification of the service, as received by the RRC layer, matches the one or more particular services associated with the indication that ACB should be bypassed.

FIG. 1 is a diagram of an example environment 100 in which systems and/or methods described herein may be implemented. As illustrated, environment 100 may include one or more user equipment (UEs) 110 (referred to singularly as "UE 110" or collectively as "UEs 110"), which may obtain network connectivity through, for example, wireless network 120. Wireless network 120 may provide access to one or more external networks, each labeled as packet data network (PDN) 150. The wireless network may include radio access network (RAN) 130 and core network 140. RAN 130 may, in some implementations, be associated with a network operator that controls or otherwise manages core network 140. Core network 140 may include an Internet Protocol (IP)-based network, such as System Architecture Evolution (SAE) core network or a General Packet Radio Service (GPRS) core network.

UE 110 may include a portable computing and communication device, such as a personal digital assistant (PDA), a smart phone, a cellular phone, a laptop computer with connectivity to a cellular wireless network, a tablet computer, etc. UE 110 may also include non-portable computing devices, such as desktop computers, consumer or business appliances, or other devices that have the ability to wirelessly connect to access network 130.

RAN130 may represent a 3GPP access network that includes one or more access technologies. Access network 130 may include base stations 132. In the context of an LTE-based access network, base stations 132 may each be referred to as an evolved NodeB (eNodeB) 132. ENodeBs 132 may each provide a radio interface over which the eNodeB may communicate with UEs 110. The radio interface may include a radio interface that implements, for example, an evolved UMTS (Universal Mobile Telecommunications System) Terrestrial Radio Access (E-UTRA) network. ENodeBs 132 may communicate with one other using the X2 interface and with devices associated with core network 140 (e.g., MME 134 and SGW 142) using the S1 interface.

Core network 140 may include an IP-based network. In the 3GPP network architecture, core network 140 may include an Evolved Packet Core (EPC). As illustrated, core network 140 may include mobility management entity (MME) 134, serving gateway (SGW) 142, and packet data network gateways (PGW) 146. Although certain network devices are illustrated in environment 100 as being part of RAN 130 and core network 140, whether a network device is labeled as being in the "RAN" or the "core network" of environment 100 may be an arbitrary decision that may not affect the operation of wireless network 120.

MME 134 may include one or more computation and communication devices that perform operations to register UEs 110 with core network 140, establish bearer channels associated with a session with UEs 110, hand off UEs 110 from one eNodeB to another, and/or perform other operations. MME 134 may generally handle control plane traffic. SGW 142 may include one or more network devices that aggregate traffic received from one or more eNodeBs 132. SGW 142 may generally handle user (data) plane traffic.

PGW 146 may include one or more devices that act as the point of interconnect between core network 140 and external IP networks, such as PDNs 150, and/or operator IP services. PGW 146 may route packets to and from the access networks and the external IP networks. SGW 142 may communicate with PGW 146 using, for example, the S5 and/or S8 interfaces.

PDNs 150 may each include packet-based networks. PDNs 150 may include external networks, such as a public network (e.g., the Internet) or proprietary networks that provide services that are provided by the operator of core network 140 (e.g., IP multimedia (IMS)-based services, transparent end-to-end packet-switched streaming services (PSSs), or other services).

The quantity of devices and/or networks, illustrated in FIG. 1, is provided for explanatory purposes only. In practice, there may be additional devices and/or networks; fewer devices and/or networks; different devices and/or networks; or differently arranged devices and/or networks than illustrated in FIG. 1. Alternatively, or additionally, one or more of the devices of environment 100 may perform one or more functions described as being performed by another one or more of the devices of environment 100.

Figure 2:
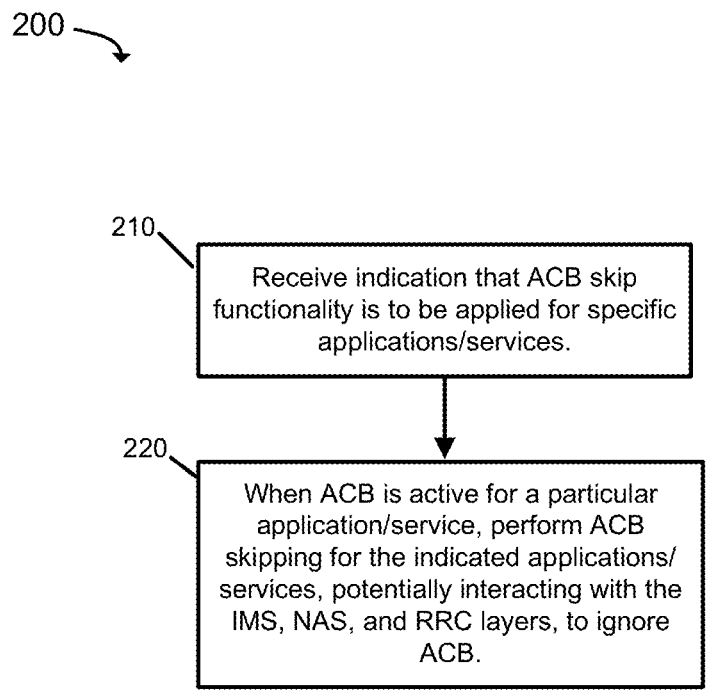
FIG. 2 is a flowchart illustrating an example of a process for performing ACB skipping.

FIG. 2 is a flowchart illustrating an example of a process 200 for performing ACB skipping. Process 200 may be performed, for example, by UE 110.

Process 200 may include receiving an indication that ACB skip functionality is to be applied for specific applications/services (block 210). For example, the specific applications/services may include the services MMTEL voice, MMTEL video, and SMS. In other implementations, UE 210 may perform ACB skipping for other applications or services. Particular applications for which ACB skipping is to be applied may be indicated in messages (e.g., broadcast or unicast messages) that are transmitted by one or more devices in wireless network 120 and received by UE 110.

In one implementation, the message indicating that ACB skipping is to be applied may be transmitted to UEs 210 as part of a System Information Block Type 2 (SIB2) broadcast message, as specified in the 3GPP TS 36.331 standard. For example the SIB2 message may include fields that indicate whether ACB skipping is to be applied for MMTEL voice, MMTEL video, and SMS. One possible implementation of such a System Information Block Type 2 message is illustrated in Table I. Table II includes field descriptions for the fields in Table I. In Tables I and II, bold font indicates text that may supplement the existing 3GPP TS 36.331 standard to implement the message.

TABLE I

SystemInformationBlockType2 information element, 3GPP TS 36.331

```
SystemInformationBlockType2 ::=      SEQUENCE {
        ac-BarringInfo               SEQUENCE {
            ac-BarringForEmergency           BOOLEAN,
            ac-BarringForMO-Signalling       AC-BarringConfig           OPTIONAL,   -- Need OP
            ac-BarringForMO-Data             AC-BarringConfig           OPTIONAL,   -- Need OP
        }                                                               OPTIONAL,   -- Need OP
        radioResourceConfigCommon    RadioResourceConfigCommonSIB
        ue-TimersAndConstants        UE-TimersAndConstants,
        freqInfo                     SEQUENCE {
            ul-CarrierFreq               ARFCN-ValueEUTRA           OPTIONAL,   -- Need OP
            ul-Bandwidth                 ENUMERATED {n6, n15, n25, n50, n75, n100}
                                                                    OPTIONAL,   -- Need OP
            additionalSpectrumEmission       Additional SpectrumEmission
        },
        mbsfn-SubframeConfigList     MBSFN-SubframeConfigList       OPTIONAL,   -- Need OR
        timeAlignmentTimerCommon     TimeAlignmentTimer,
        ...,
        lateNoncriticalExtension         OCTET STRING (CONTAINING SystemInformationBlockType2-v8h0-IEs)
                            OPTIONAL,   -- Need OP
        [[ ssac-BarringForMMTEL-Voice-r9      AC-BarringConfig           OPTIONAL,   -- Need OP
           ssac-BarringForMMTEL-Video-r9      AC-BarringConfig           OPTIONAL,   -- Need OP
        ]],
        [[ ac-BarringForCSFB-r10          AC-BarringConfig    OPTIONAL,   -- Need OP
        ]],
        [[ ac-BarringSkipForMMTEL-Voice-r12    BOOLEAN              OPTIONAL,   --Need OP,
           ac-BarringSkipForMMTEL-Video-r12    BOOLEAN              OPTIONAL,   --Need OP
           ac-BarringSkipForSMS-r12            BOOLEAN              OPTIONAL,   --Need OP
        ]],
    }
    SystemInformationBlockType2-v8h0-IEs ::=   SEQUENCE {
        multiBandInfoList        SEQUENCE (SIZE (1..maxMultiBands)) OF Additional SpectrumEmission
                OPTIONAL,   -- Need OR
        nonCriticalExtension     SystemInformationBlockType2-v9e0-IEs       OPTIONAL,   -- Need OP
    }
```

TABLE I-continued

SystemInformationBlockType2 information element, 3GPP TS 36.331

```
SystemInformationBlockType2-v9e0-IEs ::= SEQUENCE {
    ul-CarrierFreq-v9e0         ARFCN-ValueEUTRA-v9e0    OPTIONAL,    -- Cond ul-FreqMax
    nonCriticalExtension        SEQUENCE { }             OPTIONAL,    -- Need OP
}
AC-BarringConfig ::=            SEQUENCE {
    ac-BarringFactor               ENUMERATED {
                                      p00, p05, p10, p15, p20, p25, p30, p40,
                                      p50, p60, p70, p75, p80, p85, p90, p95},
    ac-BarringTime                 ENUMERATED {s4, s8, s16, s32, s64, s128, s256, s512},
    ac-BarringForASpecialAC        BIT STRING (SIZE(5))
}
MBSFN-SubframeConfiglist ::=    SEQUENCE (SIZE (1..maxMBSFN-Allocation)) OF MBSFN-
SubframeConfig
-- ASN1STOP
```

TABLE II

SystemInformationBlockType2 Field Descriptions ac-BarringFactor
If the random number drawn by the UE is lower than this value, access is allowed. Otherwise the access is barred. The values are interpreted in the range [0, 1): p00 = 0, p05 = 0.05, p10 = 0.10, . . . , p95 = 0.95. Values other than p00 can only be set if all bits of the corresponding ac-BarringForSpecialAC are set to 0.
ac-BarringForCSFB
Access class barring for mobile originating CS fallback.
ac-BarringForEmergency
Access class barring for AC 10.
ac-BarringForMO-Data
Access class barring for mobile originating calls.
ac-BarringForMO-Signalling
Access class barring for mobile originating signalling.
ac-BarringForSpecialAC
Access class barring for AC 11-15. The first/leftmost bit is for AC 11, the second bit is for AC 12, and so on.
ac-BarringTime
Mean access barring time value in seconds.
additionalSpectrumEmission
The UE requirements related to IE AdditionalSpectrumEmission are defined in TS 36.101 [42, table 6.2.4.1].
mbsfn-SubframeConfigList
Defines the subframes that are reserved for MBSFN in downlink.
multiBandInfoList
A list of additionalSpectrumEmission i.e. one for each additional frequency band included in multiBandInfoList in SystemInformationBlockType1, listed in the same order.
ssac-BarringForMMTEL-Video
Service specific access class barring for MMTEL video originating calls.
ssac-BarringForMMTEL-Voice
Service specific access class barring for MMTEL voice originating calls.
ul-Bandwidth
If the random number drawn by the UE is lower than this value, access is allowed. Otherwise the access is barred. The values are interpreted in the range [0, 1): p00 = 0, p05 = 0.05, p10 = 0.10, . . . , p95 = 0.95. Values other than p00 can only be set if all bits of the corresponding ac-BarringForSpecialAC are set to 0.
Parameter: transmission bandwidth configuration, $N_{RB}$, in uplink, see TS 36.101 [42, table 5.6-1]. Value n6 corresponds to 6 resource blocks, n15 to 15 resource blocks and so on. If for FDD this parameter is absent, the uplink bandwidth is equal to the downlink bandwidth. For TDD this parameter is absent and it is equal to the downlink bandwidth.
ul-CarrierFreq
For FDD: If absent, the (default) value determined from the default TX-RX frequency separation defined in TS 36.101 [42, table 5.7.3-1] applies.
For TDD: This parameter is absent and it is equal to the downlink frequency.
ac-BarringSkipForMMTEL-Voice-r12
If present this field indicates whether to skip access class barring for MMTEL voice originating calls for AC 0-9 and AC 11-15.
ac-BarringSkipForMMTEL-Video-r12
If present this field indicates whether to skip access class barring for MMTEL video originating calls for AC 0-9 and AC 11-15.
ac-BarringSkipForSMS-r12

TABLE II-continued

SystemInformationBlockType2 Field Descriptions

If present this field indicates whether to skip access class barring for SMS originating calls (SMS over SGs, SMS over IMS (SMS over IP), and SMS over S102) for AC 0-9 and AC 11-15.

Referring back to FIG. 2, process 200 may further include, when ACB is active for a particular service, performing ACB skipping for the indicated applications/services, potentially interacting with the IMS, NAS, and RRC layers, to ignore ACB (block 220). For example, if ACB skipping is enabled for a certain service (e.g. MMTEL voice), the UE may, upon recognizing, in the RRC layer, a NAS request for an RRC connection that is associated with MMTEL voice, implement ACB skipping by bypassing the normal ACB check. The actual implementation details of ACB skipping may vary based on the interaction of the UE with higher network layers (i.e., NAS and IMS layer). Various aspects relating to ACB skipping, with respect to IMS services, will be described below with reference to FIGS. 3, 4, and 7-10. Various aspects relating to ACB skipping, with respect to SMS services, will be described below with reference to FIGS. 5, 6, 11, and 12.

For a practical implementation of ACB skipping with IMS services, two main functionalities may need to be addressed: (1) the RRC layer may need to be made aware of a service triggered in the IMS layer; and (2) the NAS "congestion alleviation notification" may need to be handled in a different manner. The NAS congestion alleviation notification refers to a requirement, in the NAS layer, that when access to a cell is barred due to ACB for a previous RRC connection establishment procedure due to initiation of a Service Request or Tracking Area Update procedure in the NAS, the RRC will notify the barring condition to the NAS, and the NAS may not send a new request to establish an RRC connection (i.e., the NAS may not initiate a Service Request or Tracking Area Update procedure) until the RRC notifies the NAS that the congestion situation is alleviated. In this manner, the upper layers may be notified about the failure to establish the RRC connection.

When a service is triggered through the IMS layer, the RRC layer may need to be made aware of which service is being triggered in order to apply ACB skipping to the service. In one implementation, the IMS layer may notify the RRC layer directly when a particular IMS service initiates a connection by conveying the IMS service type (e.g., voice, video or SMS over IP) to the RRC layer. The notification from the IMS layer to the RRC layer may inform the RRC layer that one of the IMS services is about to start. An "RRC Connection Establishment" procedure may then be triggered and the RRC layer may apply ACB skipping (if configured for that service). The notification from the IMS layer to the RRC layer may be sent via an AT command.

In another possible implementation for making the RRC layer aware of which service is being triggered in order to apply ACB skipping to the service, the IMS layer may notify the NAS layer when one of the relevant IMS services initiates a connection, such as by conveying an indication of the service type to the NAS layer. The NAS layer may then forward the information to the RRC when the NAS requests the establishment of an RRC connection. The RRC layer may then apply ACB skipping as appropriate. The notification, from the IMS layer to the NAS layer, may be sent via the AT command.

As mentioned above, in addition to the RRC layer being aware of the ACB skip functionality, NAS standards may require that, when a service is barred due to ACB, the RRC layer notifies the barring condition to the NAS layer and the NAS layer subsequently refrains from initiating a new service request or tracking area update procedure until the RRC layer notifies the NAS layer that ACB is no longer applicable (e.g., when the congestion situation is alleviated). This requirement, if not addressed, can cause issues with ACB skipping. The issues can be described by way of example. Consider a situation in which a non-IMS application generates user plane data that subsequently triggers a NAS Service Request procedure and an RRC Connection Establishment procedure. Assume that a congestion situation exists that causes ACB to be activated. Activation of ACB may involve the RRC layer starting a timer (referred to as "timer T303," or "barring timer") that controls the barring time. Following existing NAS requirements, the NAS will not initiate another Service Request procedure until it is notified that the barring situation is alleviated, such as when the timer expires. Any IMS service initiated while the barring timer is running will fail to trigger the NAS Service Request even if the ACB skip condition is configured for that service.

One technique for handling, during ACB skipping, the requirement that the RRC layer notifies the NAS layer of the ACB barring condition, is to modify the NAS requirements to not initiate another service request for the services that are affected by ACB skip functionality (e.g., MMTel video, MMTel voice and SMS). In one implementation, these services may always trigger a NAS Service Request procedure and corresponding request to the RRC layer to establish an RRC Connection. The RRC layer, with its knowledge of whether ACB skipping is configured, can then determine whether the RRC Connection Establishment procedure can go ahead.

Figure 3:
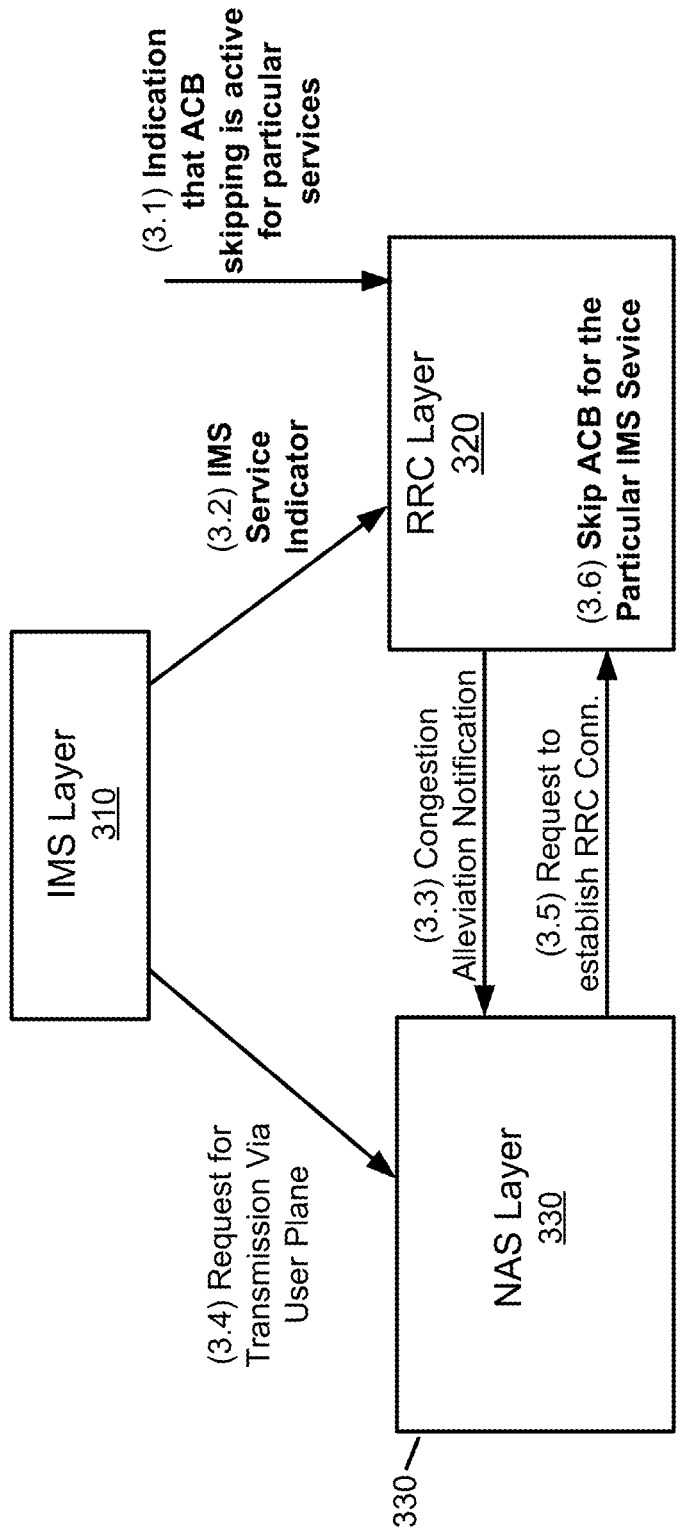
FIGS. 3 and 4 are diagrams illustrating operations relating to ACB skipping for IP multimedia (IMS) services.
Figure 4:
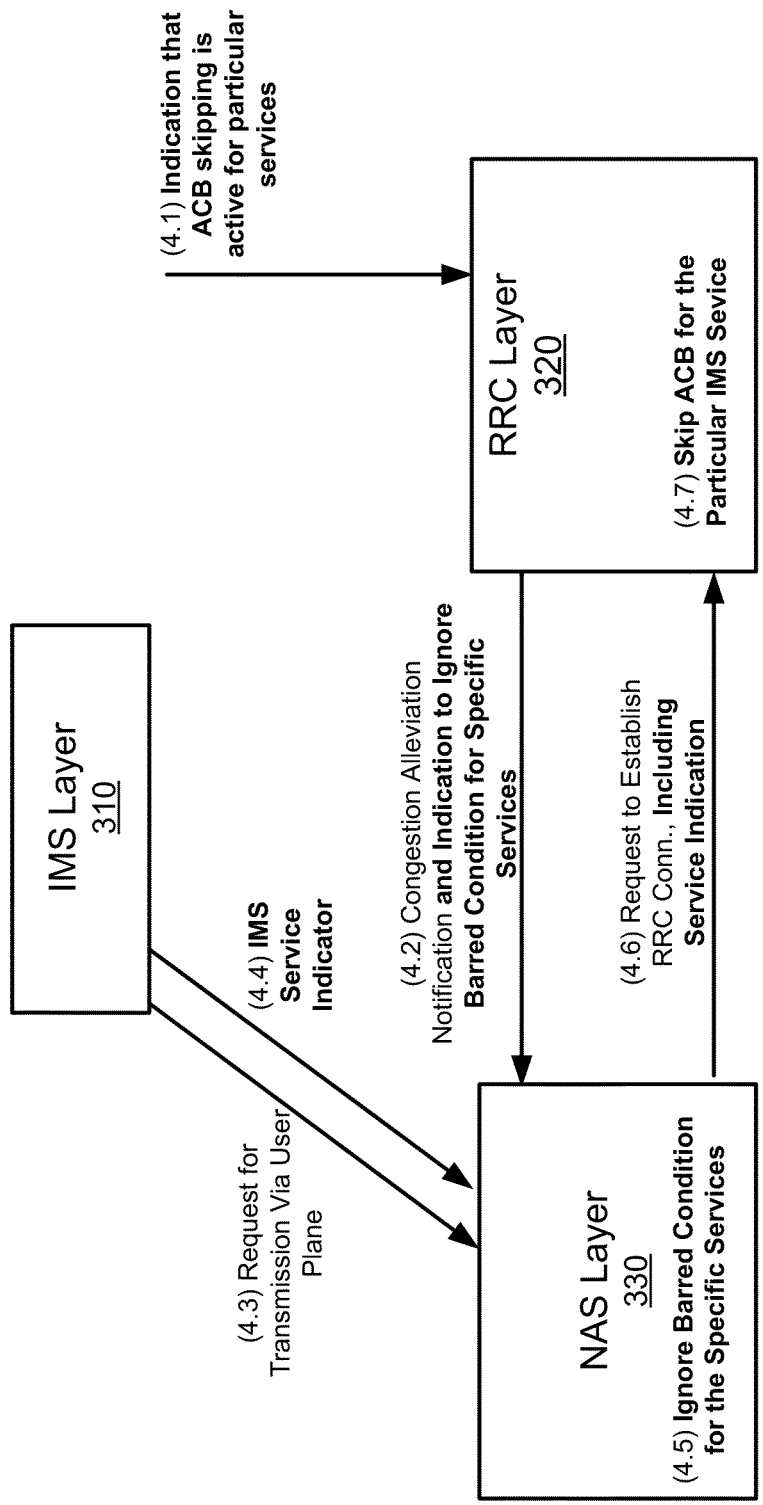

Two additional options for handling, during ACB skipping, the requirement that the RRC layer notifies the ACB barring condition to the NAS layer, will next be described with respect to FIGS. 3 and 4. In FIGS. 3 and 4, operations indicated in bold font may represent new functionality and/or processes that are associated with IMS layer 310, RRC layer 320, and NAS layer 330.

FIGS. 3 and 4 each illustrate IMS layer 310, RRC layer 320, and NAS layer 330. Each of layers 310, 320, and 330 may represent logic relating to the operation of IMS layer functionality, RRC layer functionality, and NAS layer functionality, respectively. The logic of IMS layer 310, RRC layer 320, and NAS layer 330 may be implemented within UE 110 and/or within network elements, such as eNodeB 132. In general, IMS layer 310 may perform application-level functions relating to the delivery of Internet Protocol (IP) multimedia services. RRC layer 320 may perform control functions relating to the LTE air interface control plane. An example of the functions performed by RRC layer 320 may include: receiving system information related to the NAS, receiving of system information related to the access stratum (AS), paging, security functions, mobility functions, and Quality of Service (QoS) functions. NAS layer 330 may perform control functions relating to the control plane between UEs 110 and MME 134. NAS layer 330 may represent the highest stratum of the control plane at the radio interface and may implement protocols between UE 110 and MME 134 that are not terminated in the E-UTRAN.

As illustrated in FIG. 3, RRC layer 320 may receive an indication that ACB skipping is active (at 3.1, "Indication that ACB skipping is active for particular services"). As previously mentioned, the indication may be received as part of a System Information Block Type 2 broadcast message that describes particular services for which ACB skipping is enabled. IMS layer 310 may notify RRC layer 320 when an IMS service causes triggering of a service request procedure (at 3.2, "IMS Service Indicator"). The notification may include an indication of the service (e.g., MMTel video or MMTel voice). If ACB skipping is active for the service, RRC layer 320 may stop the barring timer (timer T303). Stopping the barring timer, when ACB skipping is active for the service, may allow NAS layer 330 to request the establishment of an RRC connection in response to requests, from higher layers, such as IMS layer 310, for an IMS service (i.e., when the barring timer is stopped, RRC layer 320 will not bar connections). RRC layer 320 may also notify NAS layer 330 that congestion alleviation is active (at 3.3, "Congestion Alleviation Notification"). NAS layer 330 may receive a corresponding request for transmission from the IMS layer (at 3.4, "Request for Transmission via User Plane"). NAS layer 330 may request, to RRC layer 320, establishment of an RRC connection (at 3.5, "Request to Establish RRC Conn."). RRC layer 320, when ACB skipping is active for the particular IMS service, may perform ACB skipping for the service (at 3.6, "Skip ACB for the Particular IMS Service"). RRC layer 320 may thus establish the requested RRC connection. RRC layer 320 may reset the barring timer (timer T303) upon triggering the ACB skipping and may provide NAS layer 330 with a congestion alleviation notification when the barring timer expires or is stopped.

FIG. 4 is a diagram illustrating operations relating to another option for handling the requirement that the RRC layer notifies the NAS layer of the ACB condition. In contrast to FIG. 3, in which NAS layer 330 is not made aware of the service type, in the operations of FIG. 4, NAS layer 330 is made aware of the service type. As illustrated in FIG. 4, RRC layer 320 may receive an indication that ACB skipping is active (at 4.1, "Indication that ACB skipping is active for particular services"). As previously mentioned, the indication may be received as part of a System Information Block Type 2 message and may indicate the particular service(s) types for which ACB skipping applies. RRC layer 320 may notify NAS layer 330 that congestion alleviation is active. The notification may also include an indication to ignore ACB (i.e., ignore the barring for certain services) for particular service type(s) that were received as part of the ACB skipping message (at 4.2, "Congestion Alleviation Notification and Indication to Ignore Barred Condition for Specific Services"). In other words, when there is a potential service block due to ACB, a failure notification may be sent from RRC layer 320 to NAS layer 330 and, when ACB skipping is active, a notification indicating that NAS layer 330 should ignore ACB for particular service types may also be sent.

NAS layer 330 may receive, from IMS layer 310, a request for transmission from IMS layer (at 4.3, "Request for Transmission via User Plane"), which will trigger a service request. IMS layer 310 may also provide NAS layer 330 with an indication of the service (e.g., MMTel video or MMTel voice) (at 4.4, "IMS Service Indicator"). When the service (provided at 4.4) matches the service corresponding to the notification indicating that NAS layer 330 should ignore ACB for particular service types (provided at 4.2), NAS layer 430 may ignore ACB for the particular services (at 4.5, Ignore Barred Condition for the Specific Services"). NAS layer 330 may transmit a request, to RRC layer 320, for an establishment of an RRC connection for the service request. The request may also include an indication of the service (at 4.6, "Request to Establish RRC Conn., Including Service Indication"). RRC layer 320, when ACB skipping is active for the particular IMS service, may perform ACB skipping for the service (at 4.7, "Skip ACB for the Particular IMS Service") by establishing the requested RRC connection.

In the implementations discussed above with respect to FIGS. 3 and 4, IMS layer 310 notifies either RRC layer 320 or NAS layer 330 of the type of service being established. The indication of the service may only be needed when ACB skipping is configured for IMS services. In one implementation, RRC layer 320 may inform IMS layer 310 when ACB skipping is active, and optionally for services associated with the active ACB skipping. IMS layer 310 may then only send the service indication to RRC layer 320 (FIG. 3) or NAS layer 330 (FIG. 4) only when needed, i.e., only when the ACB skip functionality is configured. This may allow for minimization of signaling between the layers within UE 110.

In one possible variation on the operations shown in FIG. 4, the communication for 4.2 may not include the indication of which specific services can ignore the barring congestion indication. In this case, at 4.5, the barring condition may always be ignored for the services that support ACB skipping, such as all IMS and SMS services. Optionally, the communication for 4.2 can indicate "IMS only", "SMS only" or both "IMS and SMS". RRC layer 320, at 4.7, may then make the determination, based on the indicated service type, of whether the request to establish the RRC connection.

FIGS. 3 and 4, as discussed above, illustrate various aspects relating to ACB skipping with respect to IMS services. Various aspects relating to ACB skipping with respect to SMS (e.g., SMS over the SG or S102 interface) services will be next described below with reference to FIGS. 5 and 6. In general, SMS services may be received directly in the NAS layer 330 and a corresponding service type notification may be sent from NAS layer 330 to RRC layer 320 without need of an extra notification. Similarly, it may not be sufficient for RRC 320 to be aware of ACB skipping and it may be necessary to address the NAS congestion alleviation notification.

Figure 5:
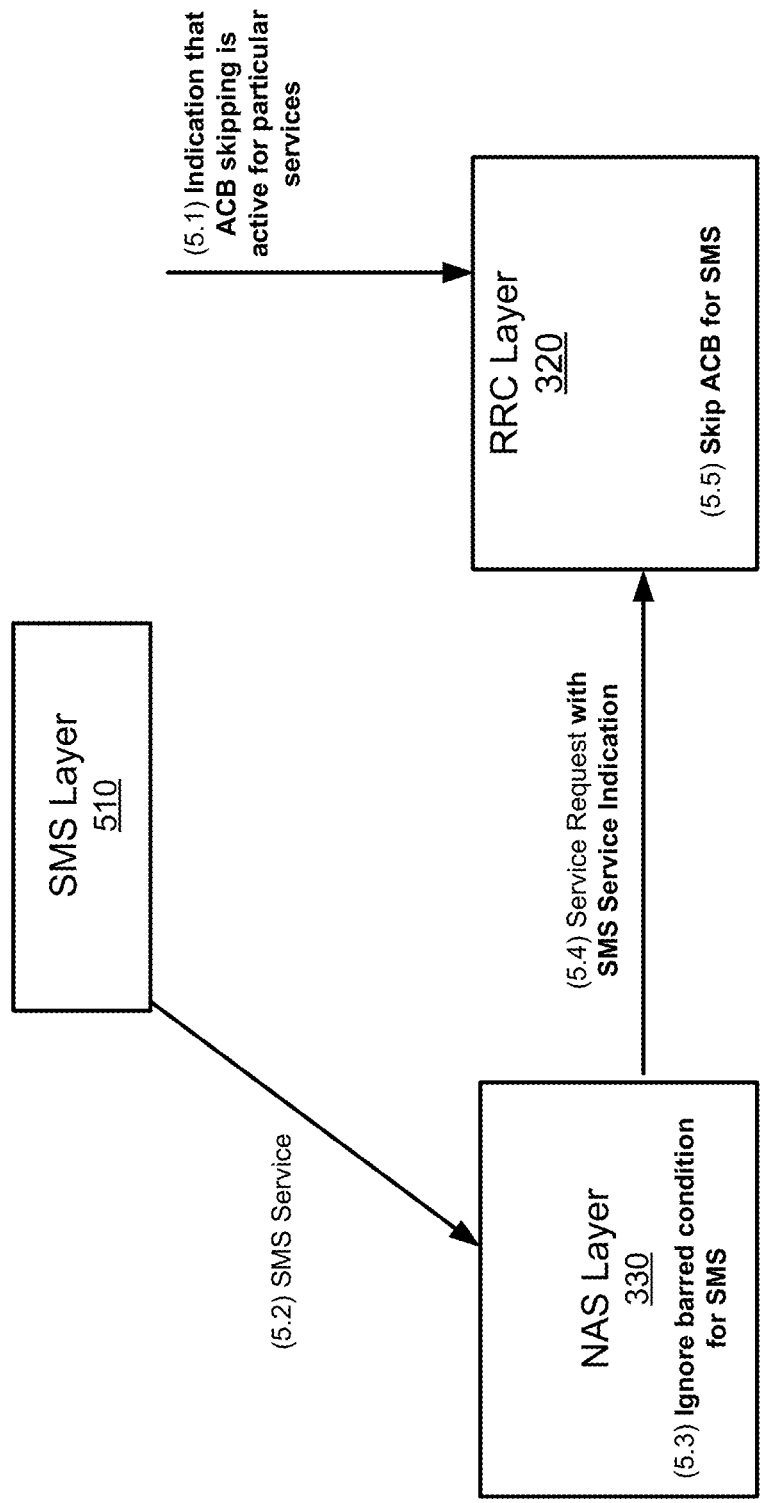
FIGS. 5 and 6 are diagrams illustrating operations relating to ACB skipping for SMS services.

FIG. 5 is a diagram illustrating operations relating to handling the requirement that the RRC layer notifies the NAS layer of the cell barring condition (e.g., for handling the NAS congestion alleviation notification). As illustrated in FIG. 5, SMS layer 510 may communicate with NAS layer 330. SMS layer 510 may represent application layer logic relating to the operation of SMS functionality. The logic of SMS layer 510 may be implemented within UE 110 and/or within network elements of wireless network 120. In the implementation of FIG. 5, NAS layer 330 may ignore the barring indication (i.e., the barring indication does not apply to the NAS layer).

As illustrated in FIG. 5, RRC layer 320 may receive an indication that ACB skipping is active (at 5.1, "Indication that ACB Skipping is Active for particular services"). As previously mentioned, the indication may be received as part of a System Information Block Type 2 message. SMS layer 510 may notify NAS layer 320 when an SMS is to be transmitted (at 5.2, "SMS Service"). NAS layer 330 may ignore any ACB conditions for the SMS request for transmission (at 5.3, "Ignore ACB for SMS"). For example, RRC layer 320 may refrain from notifying NAS layer 330 of the congestion alleviation condition (e.g., refrain from indicating ACB is active). NAS layer 330 may trigger a service request procedure, and send an indication of the SMS service, to RRC layer 320 (at 5.4, "Service Request with SMS Service Indication") and request to trigger an RRC connection establishment. RRC layer 320, when ACB skipping is active for SMS originating calls, may perform ACB skipping for the SMS service (at 5.5, "Skip ACB for SMS").

Figure 6:
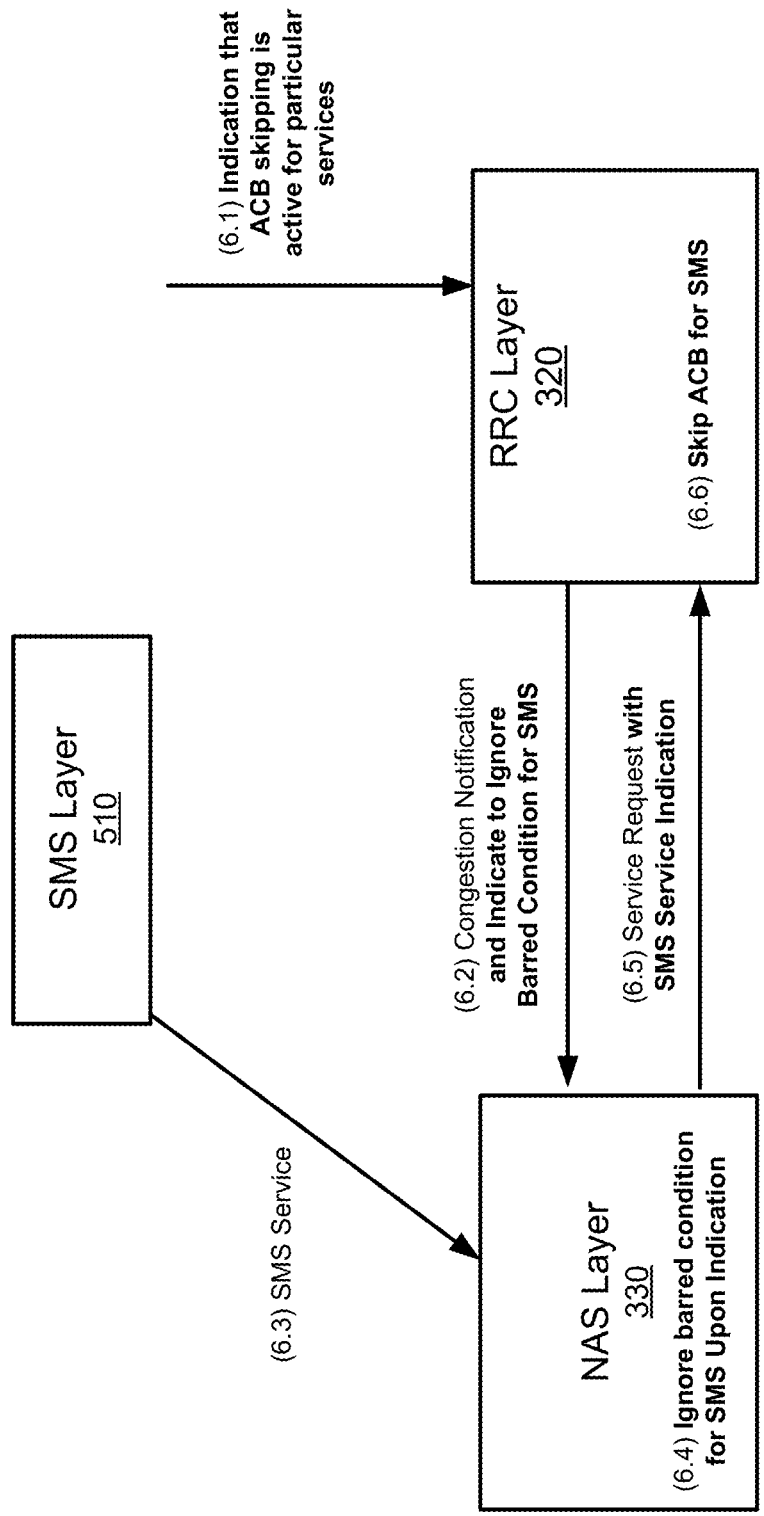

FIG. 6 is a diagram illustrating operations relating to another option for handling the requirement that the RRC layer notifies the NAS layer of the cell barred condition (e.g., for handling the NAS congestion alleviation notification). In the implementation of FIG. 6, NAS layer 330 may ignore, based on an indication from RRC layer 320, the ACB barring condition for SMS services.

As illustrated in FIG. 6, RRC layer 320 may receive an indication that ACB skipping is active (at 6.1, "Indication that ACB Skipping is Active for particular services"). As previously mentioned, the indication may be received as part of a System Information Block Type 2 message and may indicate the particular service(s) types, such as SMS services (e.g., SMS originating calls), for which ACB skipping applies. RRC layer 320 may notify NAS layer 330 that congestion alleviation is active. The notification may also include an indication to ignore the cell barred condition for SMS services (at 6.2, "Congestion Notification and Indicate to Ignore Barred Condition for SMS"). SMS layer 510 may notify NAS layer 330 when an SMS is to be sent (at 6.3, "SMS Service"). NAS layer 330 may ignore any cell barred conditions for the SMS service when the indication to ignore the barred condition for SMS was previously received (at 6.4, "Ignore barred condition for SMS Upon Indication") (e.g., as previously received at 6.2). NAS layer 330 may trigger a service request procedure, and send a request for establishment of an RRC connection and an indication of the SMS service, to RRC layer 320 (at 6.5, "Service Request with SMS Service Indication"). RRC layer 320, when ACB skipping is active for SMS originating calls, may perform ACB skipping for the SMS service (at 6.6, "Skip ACB for SMS"). The operations of FIG. 6 may generally relate to RRC layer 320 informing NAS layer 330 when a cell barred condition, due to congestion, does not apply to SMS. This may be performed for simplicity when a previous request for establishment of an RRC connection is provided by NAS layer 330 and is barred by RRC layer 320. In this case, RRC layer 320 may send the failure indication due to congestion (at 6.2) to NAS layer 330, potentially including the indication to ignore the barred condition for SMS in future requests. When an SMS service is triggered in the future, NAS layer 330 may start the service request procedure and ignore the barred condition.

Additionally, more detailed implementations, to implement ACB skipping, will next be described with reference to FIGS. 7-12. The additional implementations of FIGS. 7-12 may represent more detailed and/or lower level implementations relative to the descriptions of FIGS. 3-6. In FIGS. 7-12, bold text may indicate new functionality or modified functionality relating to existing techniques. Italicized text may additionally indicate communications that can occur asynchronously and at arbitrary times.

Figure 7:
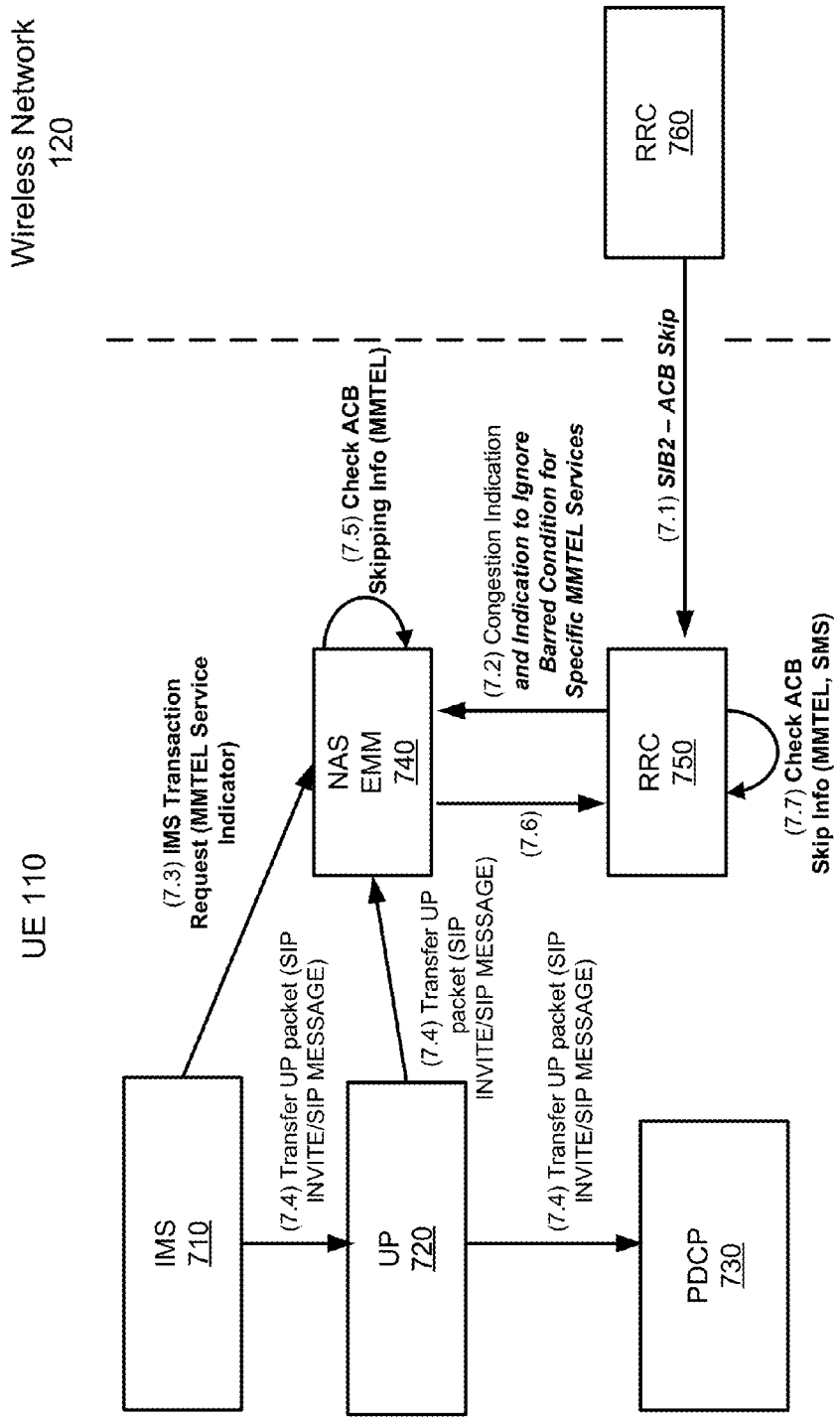
FIGS. 7-12 are diagrams illustrating, in additional detail, possible implementations for implementing ACB skipping.

FIG. 7 is a diagram illustrating an implementation of ACB skipping based on the description of FIG. 4. As shown in FIG. 7, functionality implemented by UE 110 may include: IMS component 710, user plane (UP) component 720, Packet Data Convergence Protocol (PDCP) component 730, NAS EPS Mobility Management (EMM) component 740, and RRC component 750. As is further shown in FIG. 7, functionality implemented by wireless network 120, such as by eNodeB 132, may include RRC component 760. Each of components 710-750 may represent logic relating to the operation of different protocol layers at UE 110. Similarly, component 760 may represent logic relating to the operation of the RRC layer in wireless network 120.

IMS component 710 may perform functions relating to IMS services. UP component 720 RRC layer 320 may perform functions relating to user plane traffic. PDCP component 730 may perform functions relating to the PDCP layer. The functions may include, for example, header compression and decompression of IP data, transfer of data (user plane or control plane), and maintenance of PDCP sequence numbers (SNs). NAS EMM component 740 may perform functions relating to the EPS mobility management protocol for the control of mobility of UE 110 with respect to wireless network 120. RRC component 750 may perform control functions relating to the LTE air interface control plane with respect to the operations of UE 110. RRC component 760 may perform control functions relating to the LTE air interface control plane with respect to the operations of wireless network 120.

As illustrated in FIG. 7, RRC component 750 may receive, from RRC component 760, an indication (which may include one or more messages or information elements) that ACB skipping is active. As previously mentioned, the indication may be received as part of a SIB2 message (at 7.1, "SIB2—ACB skip"). If RRC component 750 receives a request for establishment of an RRC connection due to a service request procedure in NAS, associated with an application, to establish an RRC connection and access is denied (i.e., the application is not configured for ACB skipping and ACB barring is active for the cell), RRC component 750 may notify NAS EMM component 740 that congestion alleviation is active (e.g., that ACB is active) but that ACB skipping is also configured for one or more specified services (at 7.2, "Congestion Indication and Indication to Ignore Barred Condition for Specific MMTEL services").

When IMS component 710 starts MMTel voice, MMTel video or MMTel SMS, IMS component 710 may send a request (or indication) to NAS EMM component 740 (at 7.3, "IMS Transaction Request (MMTEL Service Indicator)"). The request may include a notification of the service (e.g., what type of application/service, such as MMTel voice, MMTel video or MMTel SMS) that should be started. The request may be implemented via an AT command transmitted from IMS component 710 to NAS EMM component 740. In parallel, IMS component 710 may transfer a user plane packet (via UP component 720) that includes a Session Initiation Protocol (SIP) INVITE/SIP MESSAGE to NAS EMM component 740 (at 7.4, "Transfer UP packet (SIP INVITE/SIP Message)").

In response to the request (communication 7.3), NAS EMM component 740 may determine whether ACB is active for the service, and whether an indication to perform ACB skipping was previously received for the service (at 7.5, "Check ACB Skipping Info (MMTEL)"). If ACB skip is configured for that service and ACB skipping is configured for that specific IMS service, NAS EMM component 740 may bypass any previously received indication to bar service requests.

NAS EMM component 740 may transmit a request, to RRC component 750, for the establishment of an RRC connection for the service. The request may also include an indication of the service (at 7.6, "Establish RRC Conn Request (MMTEL Service Indicator)"). The indication of the service could be generic (e.g. UE originated bypass of ACB) or more specific (i.e., as discussed above per-application or service, such as MMTel voice).

RRC component 750, when ACB skipping is active for the particular service, may perform ACB skipping for the service (at 7.7, "Check ACB Skip Info (MMTEL, SMS")) by establishing the requested RRC connection. When ACB skipping is not active for the particular service type but ACB is active, RRC component 750 may, pursuant to normal ACB procedures, potentially ignore the request for establishment of an RRC connection.

Figure 8:
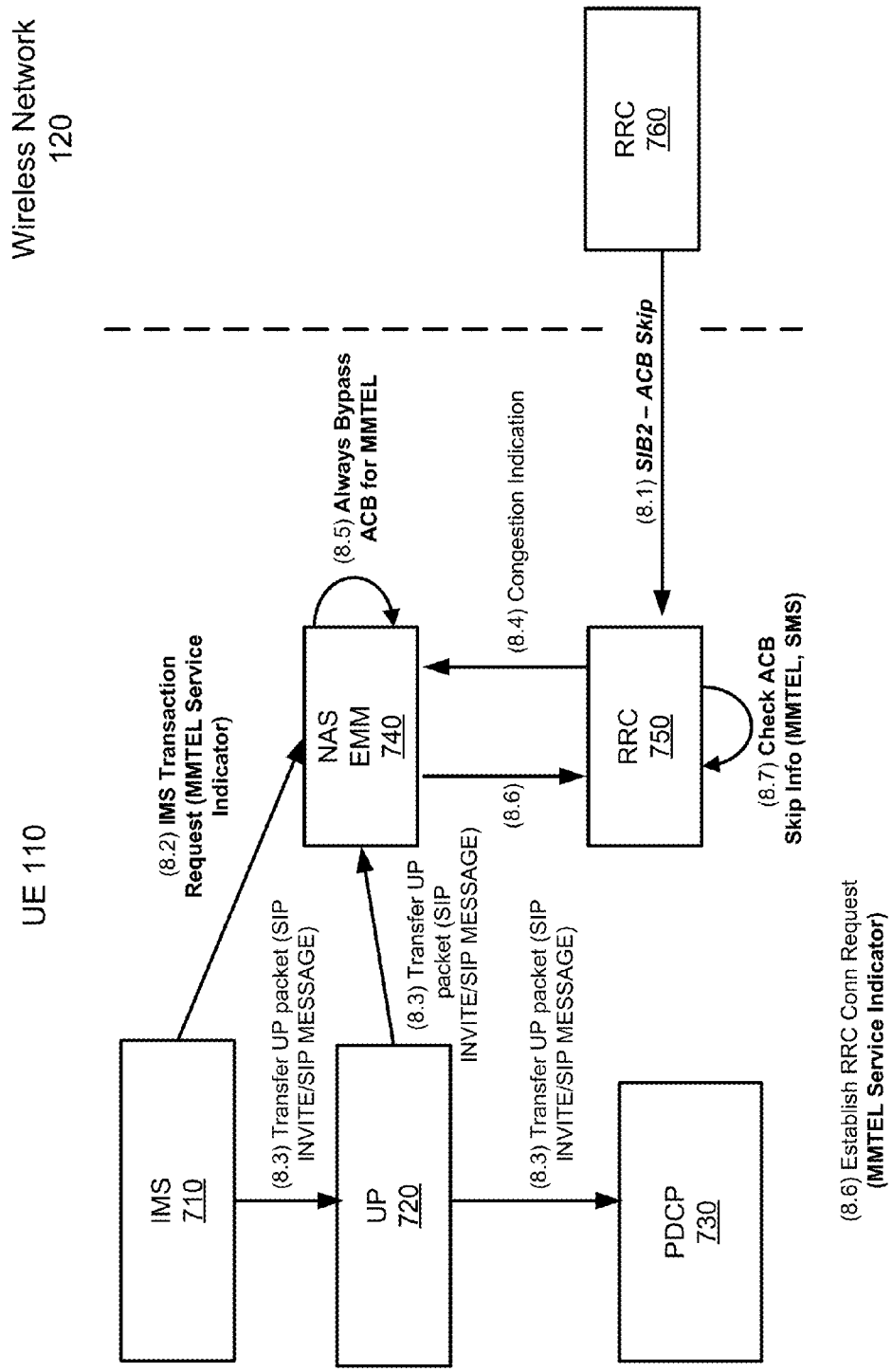

FIG. 8 is a diagram illustrating another possible implementation of ACB skipping based on the description of FIG. 4. As illustrated, RRC component 750 may receive, from RRC component 760, an indication (which may include one or more messages or information elements) that ACB skipping is active. As previously mentioned, the indication may be received as part of a System Information Block Type 2 (SIB2) message (at 8.1, "SIB2—ACB skip").

When IMS component 710 starts MMTel voice, MMTel video or MMTel SMS, IMS component 710 may send a request (or indication) to NAS EMM component 740 (at 8.2, "IMS Transaction Request (MMTEL Service Indicator)"). The request may include a notification of the service type (e.g., what type of application, such as MMTel voice, MMTel video or MMTel SMS) that should be started. The request may be implemented via an AT command transmitted from IMS component 710 to NAS EMM component 740. In parallel, IMS component 710 may transfer a user plane packet (via UP component 720) that includes a Session Initiation Protocol (SIP) INVITE/SIP MESSAGE to NAS EMM component 740 (at 8.3, "Transfer UP packet (SIP INVITE/SIP Message)").

NAS EMM component 740 may receive an indication to bar service requests (at 8.4, "Congestion Indication") (i.e., an indication that ACB is active). In this implementation, NAS EMM component 740 does not know if ACB skipping is configured. Accordingly, NAS EMM component 740 may always bypass any previous indication that it received from RRC component 750 to bar service requests (i.e., to perform ACB) for any of the following list of service types: MMTel voice, MMTel video or MMTel SMS (at 8.5, "Always Bypass ACB for MMTEL").

NAS EMM component 740 may transmit a request, to RRC component 750, for the establishment of an RRC connection (i.e., a user plane radio resource) for the service. The request may also include an indication of the service (at 8.6, "Establish RRC Conn Request (MMTEL Service Indicator)"). The indication of the service could be generic (e.g. UE originated bypass of ACB) or more specific (i.e., as discussed above per-application or service type, such as MMTel voice). For example, a field indicating the "RRC establishment cause" may be set to indicate the service.

Alternatively or additionally, a new or different call type may be implemented instead of the "RRC establishment cause".

RRC component 750, when ACB skipping is active for the particular service, may perform ACB skipping for the service (at 8.7, "Check ACB Skip Info (MMTEL, SMS)" and establish the requested connection. When ACB skipping is not active for the particular service, but ACB is active, RRC component 750 may, pursuant to normal ACB procedures, potentially ignore the request for establishment of an RRC connection.

Figure 9:
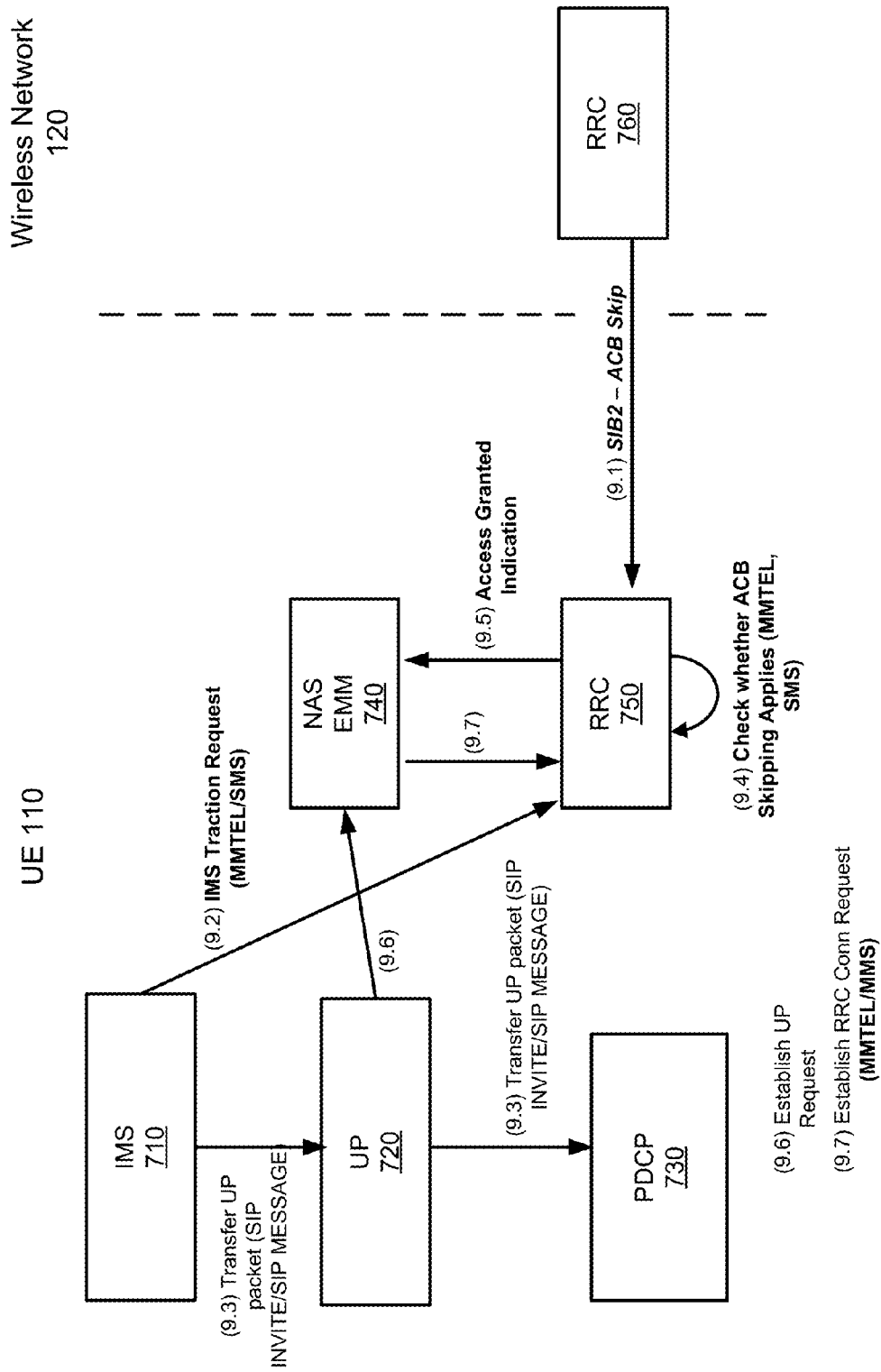

FIG. 9 is a diagram illustrating a possible implementation of ACB skipping based on the description of FIG. 3. As illustrated, RRC component 750 may receive, from RRC component 760, an indication that ACB skipping is active. As previously mentioned, the indication may be received as part of a SIB2 message (at 9.1, "SIB2—ACB skip").

When IMS component 710 starts MMTel voice, MMTel video or MMTel SMS, IMS component 710 may send a request to RRC component 750 (at 8.2, "IMS Transact Request (MMTEL Service Indicator)"). The request may include a notification of the service type that should be started. The request may be implemented via an AT command transmitted from IMS component 710 to RRC component 750. IMS component 710 may additionally transmit a user plane packet (via UP component 720) that includes a Session Initiation Protocol (SIP) INVITE/SIP MESSAGE to UP component 720, which may transmit the user plane packet to PDCP component 730 (at 9.3, "Transfer UP packet (SIP INVITE/SIP Message)").

When ABC skipping is active for the service type indicated in the request of communication 9.2 (at 9.4, "Check whether ACB Skipping Applies (MMTEL, SMS)"), RRC component 750 may inform NAS EMM component 740 that access is granted and that NAS EMM component 740 should bypass any previous indication, received from RRC component 750, to bar service requests (at 9.5, "Access Granted Indication"). Because RRC component 750 does not notify NAS EMM component 740 of the service (i.e., NAS EMM component 740 is unaware of the service), service requests may be triggered in NAS EMM component 740 for any application from that point on.

At some point, the IMS signaling message may be received at NAS EMM component 740 (at 9.6, "Establish UP Request"). In response, NAS EMM component 740 may initiate the service.

NAS EMM component 740 may trigger a service request and send, to RRC component 750, a request for the establishment of an RRC connection for the service (at 9.7, "Establish RRC Conn Request (MMTEL/MMS)"). RRC component 750, because it received the transaction request from IMS component 710 (at 9.2), may be aware of the service type (e.g., MMTel voice, MMTel video, or MMTel SMS) related to the RRC connection establishment request received at 9.7. RRC component 750, when ACB skipping is active for the particular service, may perform ACB skipping for the service and establish the requested connection. When ACB skipping is not active for the particular service type, but ACB is active, RRC component 750 may, pursuant to normal ACB procedures, potentially ignore the request for establishment of an RRC connection.

Figure 10:
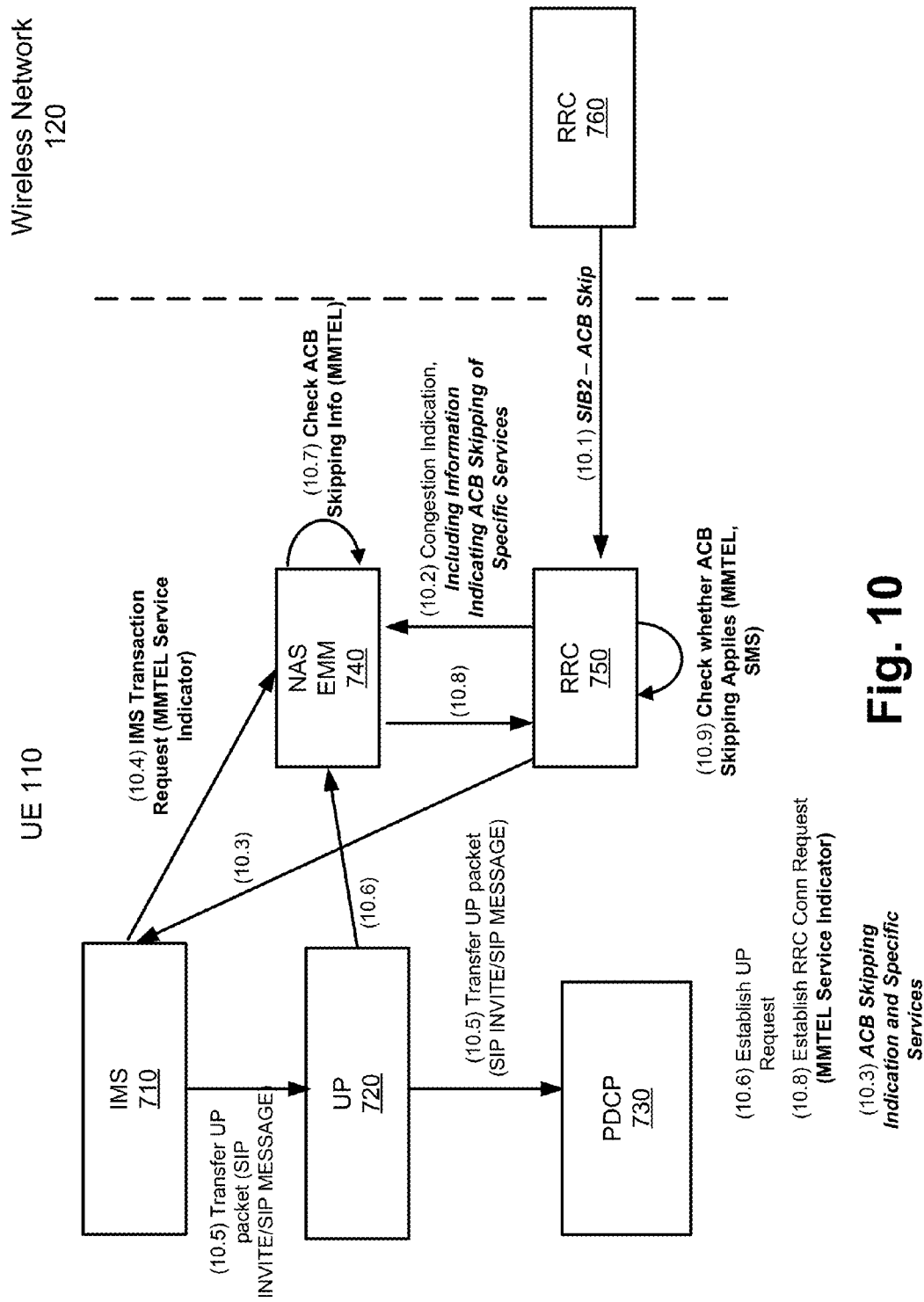

FIG. 10 is a diagram illustrating a possible implementation of ACB skipping based on a combination of the descriptions of FIGS. 3 and 4. As illustrated, RRC component 750 may receive, from RRC component 760, an indication that ACB skipping is active. As previously mentioned, the indication may be received as part of a SIB2 message (at 10.1, "SIB2—ACB skip").

If RRC component 750 receives a request for establishment of an RRC connection, associated with a service, to establish an RRC connection and access is denied (i.e., the application is not configured for ACB skipping and ACB barring is active), RRC component 750 may notify NAS EMM component 740 that the service is barred (e.g., that ACB is active) but that ACB skipping is also configured for one or more specified services (at 10.2, "Congestion Indication, Including Information Indicating ACB Skipping of Specific Services").

RRC component 750 may notify IMS component 710 that ACB skipping is configured, and for which services (e.g., MMTel voice, MMTel video, or MMTel SMS) the ACB skipping is configured (at 10.3, "ACB Skipping Indication and Specific Services").

When IMS component 710 starts MMTel voice, MMTel video or MMTel SMS, IMS component 710 may send a request to NAS EMM component 740 (at 10.4, "IMS Transaction Request (MMTEL Service Indicator)"). The request may include a notification of the service (e.g., what type of application, such as MMTel voice, MMTel video or MMTel SMS) that should be started. Alternatively, in an implementation similar to that illustrated in FIG. 9, the request may be transmitted to RRC component 750. IMS component 710 may additionally transmit a user plane packet (via UP component 720) that includes a Session Initiation Protocol (SIP) INVITE/SIP MESSAGE to UP component 720, which may transmit the user plane packet to PDCP component 730 (at 10.5, "Transfer UP packet (SIP INVITE/SIP MESSAGE)"). At some point, the IMS signaling message may be received at NAS EMM component 740 (at 10.6, "Establish UP Request"). In response, NAS EMM component 740 may initiate the service.

In this implementation, NAS EMM component 740 knows when ACB skipping is configured for particular services (due to communication 10.3). Accordingly, NAS EMM component 740 may bypass any previous indication that it received from RRC component 750 to bar service requests corresponding to the particular services (at 10.7, "Check ACB Skipping Info (MMTEL)").

NAS EMM component 740 may transmit a request, to RRC component 750, for the establishment of an RRC connection for the service. The request may also include an indication of the service (at 10.8, "Establish RRC Conn Request (MMTEL Service Indicator)"). The indication of the service could be generic (e.g. UE originated bypass of ACB) or more specific (i.e., as discussed above per-application or service, such as MMTel voice).

RRC component 750, when ACB skipping is active for the particular service type, may perform ACB skipping for the service (at 10.9, "Check whether ACB Skipping Applies (MMTEL, SMS") and establish the requested connection. When ACB skipping is not active for the particular service, but ACB is active, RRC component 750 may, pursuant to normal ACB procedures, potentially ignore the request for establishment of an RRC connection.

Figure 11:
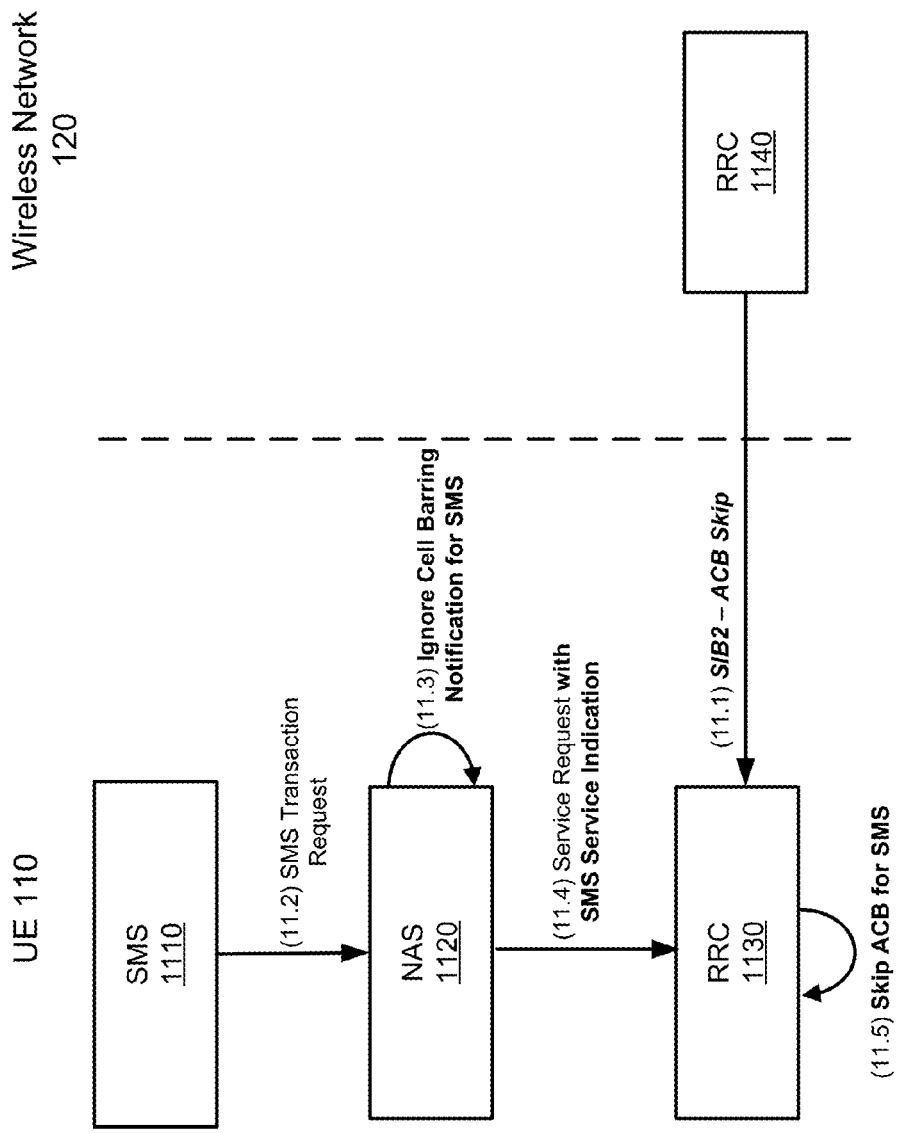

FIG. 11 is a diagram illustrating a possible implementation of ACB skipping, for SMS over the SG or S102 interface, based on the description of FIG. 5. As shown in FIG. 11, functionality implemented by UE 110 may include: SMS component 1110, NAS component 1120, and RRC component 1130. As is further shown in FIG. 11, functionality implemented by wireless network 120, such as by eNodeB 132, may include RRC component 1140. Each of components 1110-1130 may represent logic relating to the operation of different protocol layers at UE 110. Similarly, component 1140 may represent logic relating to the operation of the RRC layer in wireless network 120.

SMS component 1110 may perform functions relating to SMS services. NAS component 1120 may perform control functions relating to the control plane between UE 110 and MME 134. RRC components 1130 may perform control functions, at UE 110, relating to the LTE air interface control plane. Similarly, RRC component 1140 may perform control functions, in wireless network 120, relating to the LTE air interface control plane.

As illustrated in FIG. 11, RRC component 1130 may receive, from RRC component 1140, an indication that ACB skipping is active. As previously mentioned, the indication may be received as part of a SIB2 message (at 11.1, "SIB2—ACB skip"). SMS component 1110 may notify NAS component 1120 when an SMS request is made (at 11.2, "SMS Transaction Request"). NAS component 1120 does not know whether ACB skipping is configured. In this implementation, NAS component 1120 may thus always bypass any previous indication, received from RRC component 1130, to bar service requests (i.e., ACB) from the SMS service (at 11.3, "Ignore Cell Barring Notification for SMS"). NAS component 1120 may forward a corresponding service request procedure, and an indication of the SMS service, to RRC component 1130 (at 11.4, "Service Request with SMS Service Indication") to establish an RRC connection. The indication of the SMS service could be generic (e.g., UE originated bypass of ACB) or more specific (e.g., as discussed above, a particular service, such as SMS originated calls). RRC component 1130, when ACB skipping is active for SMS services, may perform ACB skipping for the SMS service (at 11.5, "Skip ACB for SMS").

Figure 12:
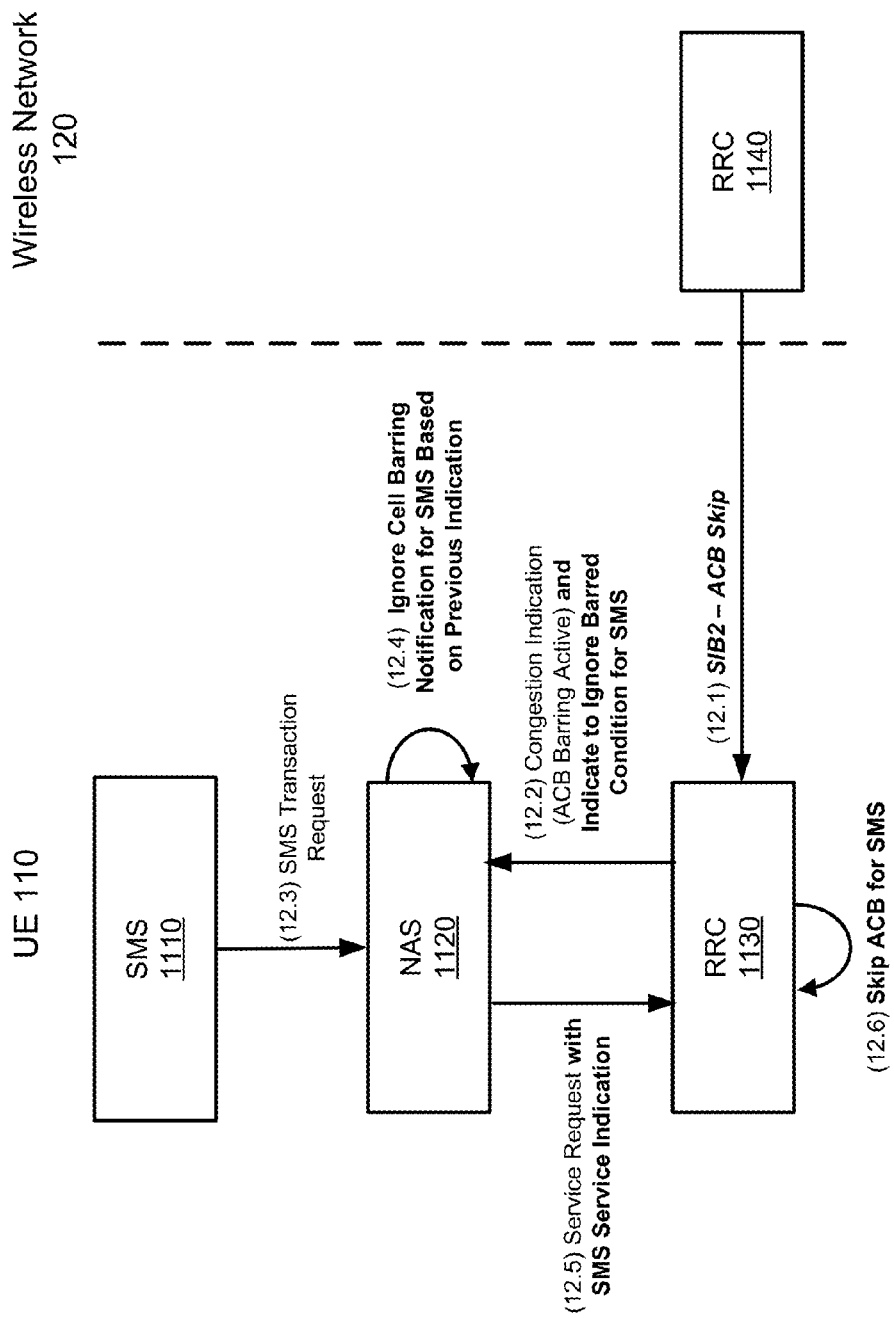

FIG. 12 is a diagram illustrating a possible implementation of ACB skipping, for SMS over the SG or S102 interface, based on the description of FIG. 6. As previously mentioned, the indication may be received as part of a SIB2 message (at 12.1, "SIB2—ACB skip"). If RRC component 1130 receives a request for establishment of an RRC connection due to a service request from NAS component 1120 and access is denied for the request (e.g., ACB is active and the service is not configured for ACB skipping), RRC component 1130 may notify NAS component 1120 that the requested service is barred and that ACB skipping is active for SMS (at 12.2, "Congestion Indication (ACB Barring Active) and Indicate to Ignore Barred Condition for SMS").

SMS component 1110 may notify NAS component 1120 when an SMS request is made (at 12.3, "SMS Transaction Request"). NAS component 1120 may ignore any ACB conditions for the SMS request when the indication to ignore the barred condition for SMS was previously received (at 12.4, "Ignore Cell Barring Notification for SMS Based on Previous Indication"). NAS component 1120 may forward a corresponding service request procedure, and an indication of the SMS service, to RRC component 1130 (at 12.5, "Service Request with SMS Service Indication"), with a request for establishment of an RRC connection. The indication of the SMS service could be generic (e.g., UE originated bypass of ACB) or more specific (i.e., as discussed above, a particular service, such as SMS originated calls). RRC component 1130, when ACB skipping is active for SMS services, may perform ACB skipping for the SMS service (at 12.6, "Skip ACB for SMS").

As discussed above, in order for the RRC layer to know when to start applying ACB skipping, the IMS layer may notify the NAS/RRC layer of the initiation of the IMS call before the SIP INVITE is sent by the IMS layer (e.g., see FIGS. 7-10). At this point the RRC layer can determine to apply ACB skipping (when applicable) in the manner discussed above. The determination of when to apply ACB skipping may be referred to herein as a "Start" indication.

In addition to starting ACB skipping, it can be important to appropriately stop ACB skipping (referred to as a "Stop" indication herein). Two possible techniques for implementing the Stop indication may include: (1) an implementation specific technique, in which determining when ACB skipping should no longer be applied is performed based on particular UE implementations; or (2) the Stop indication is implemented as a standardized indication that is transmitted from the IMS layer to the NAS and/or RRC layer.

With respect to technique (1) (implementation specific), UE 110 may apply ACB skipping for a single RRC Connection Establishment attempt, or, alternatively or additionally, UE 110 may apply ACB skipping for a certain period of time. In some implementations, UE 110 could determine when to stop performing ACB skipping based on internal information exchange between layers and/or based on Deep Packet Inspection (DPI) of packets in the user plane (for example, to determine when an IMS call has completed).

With respect to technique (2) (standardized Stop Indication), in one implementation, a standardized Stop Indication may be sent, by the IMS layer, after the IMS layer receives a SIP 200 OK message in response to the SIP INVITE message. Alternatively or additionally, the IMS layer may inform the NAS layer and/or the RRC layer that an IMS service is ended, completed, or released by sending the Stop Indication. As a more specific example that may be applicable to IMS voice and video calls, the IMS layer may send the Stop Indication after the IMS layer (at the UE) receives the SIP 200 OK in response to the SIP BYE or after the IMS layer successfully sends a SIP 200 OK in response to a SIP BYE (for the case where the call release is initiated by the remote party via a SIP BYE). For IMS services such as SMS, the IMS messages that indicate completion of the service may be different.

The IMS layer may send the Stop Indication for cases where the IMS service ends abnormally. For example, when a failure condition occurs within the IMS layer or when the user aborts an IMS call establishment attempt before it is successfully established, the IMS layer may additionally send the Stop Indication. It can be import to inform the NAS layer and/or the RRC layer when the IMS service is ended, completed, or released because a Radio Link Failure, RRC Connection Re-establishment Failure, or RRC Connection Failure may occur during the IMS call. These failures may result in the RRC Connection being released and may trigger the NAS layer to perform a Tracking Area Update (TAU) procedure in an attempt to recover the NAS signaling connection and the user plane bearers.

Figure 13:
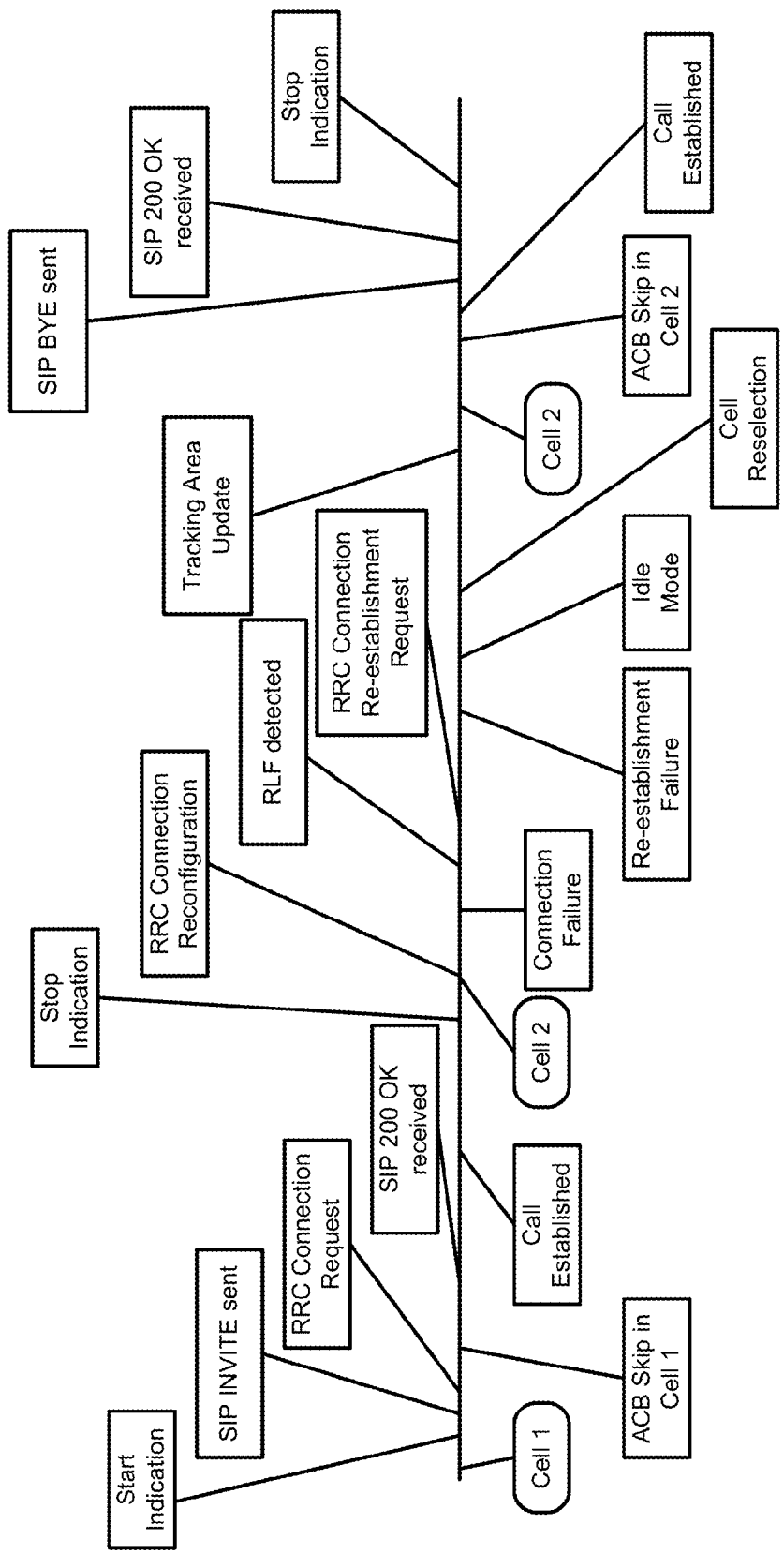
FIG. 13 is a diagram illustrating an example timeline of communications, associated with a sample communication session, in which standardized Stop indications are used.

FIG. 13 is a diagram illustrating an example timeline of communications, associated with a sample communication session, in which standardized Start and Stop Indications are used (e.g., technique (2)). As illustrated, assume UE 110 enters a cell ("Cell 1") of wireless network 120 and the IMS layer, of UE 110, initiates a service request ("Start Indication") (e.g., for MMTEL Voice). As part of the service request, a SIP INVITE message may be sent ("SIP INVITE sent") and a connection request made to the RRC layer ("RRC Connection Request"). The RRC connection request may be established because ACB skipping may be active for the cell ("ACB Skip in Cell 1"). In response to the SIP INVITE message, a SIP 200 OK response may be received by UE 110 ("SIP 200 OK received"). The call may be established ("Call Established"), and based on the receiving of the SIP 200 OK message, the IMS layer may transmit a Stop indication to the RRC or NAS layer ("Stop Indication").

At some point, assume UE 110 changes cells to a second cell ("Cell 2"). Changing cells may result in a handover operation, which may include reconfiguration or re-connection of the RRC channel ("RRC Connection Reconfiguration"). Further, assume that a connection failure occurs. The failure may include a radio link failure, which may be detected by UE 110 ("RLF detected"). UE 110 may subsequently attempt to re-establish a connection ("RRC Connection Re-establishment Request"). Assume that the re-establishment attempt fails ("Re-establishment Failure") and that UE 110 enters idle mode ("Idle Mode"). At some point, the cell may be reselected ("Cell Reselection") and a tracking area update procedure may be performed, by the NAS layer, in an attempt to recover the NAS signaling connection and the user plane bearers ("Tracking Area Update" and "Cell 2 [second reference to 'Cell2']"). ACB skipping may be active in cell 2 ("ACB Skip in Cell 2"). UE 110 may establish a new call ("Call Established") and the IMS layer of UE 110 may transmit the Stop indication ("Stop Indication") after the UE IMS layer receives the SIP 200 OK message in response to the SIP BYE message being sent ("SIP BYE sent" and "SIP 200 OK received").

Figure 14:
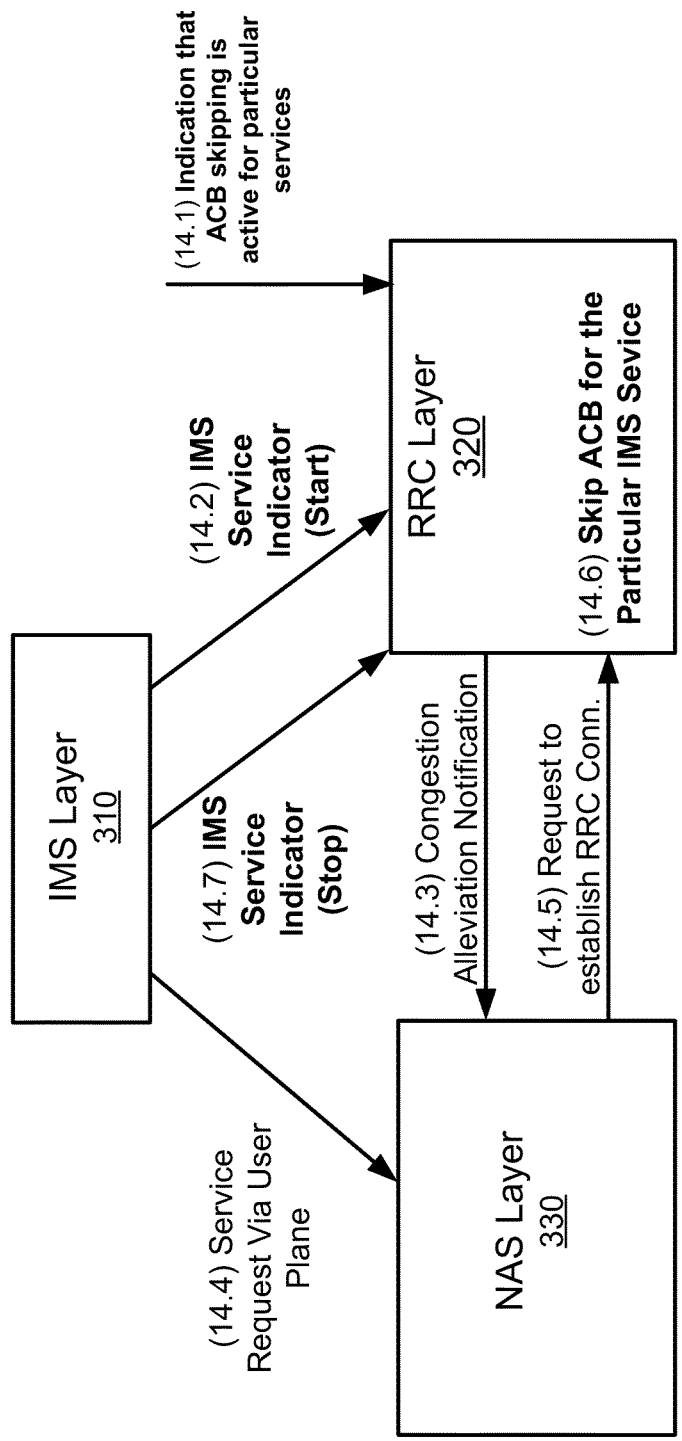
FIGS. 14-16 are diagrams illustrating different implementations relating to operations for generating Stop and Start indications.
Figure 15:
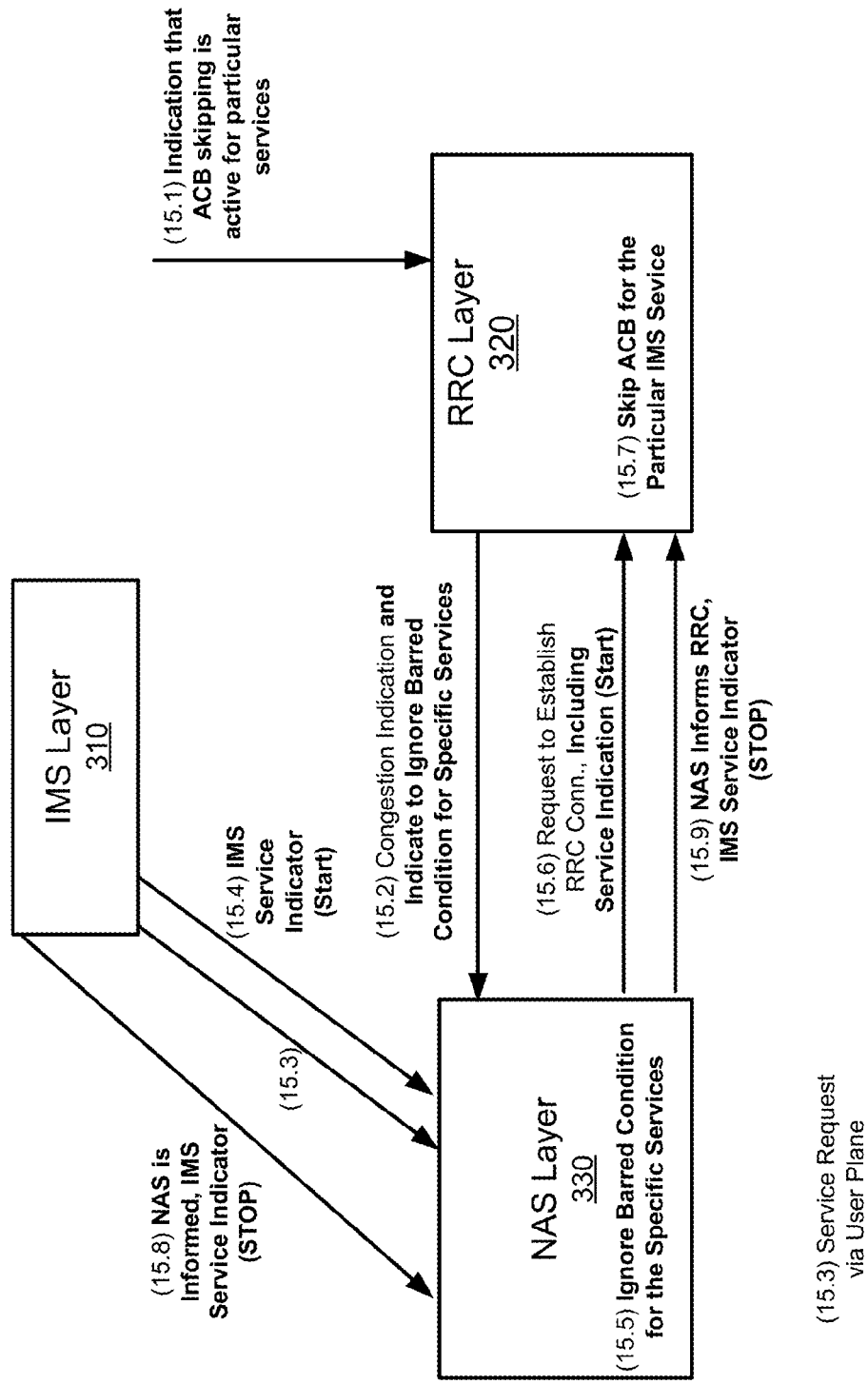
Figure 16:
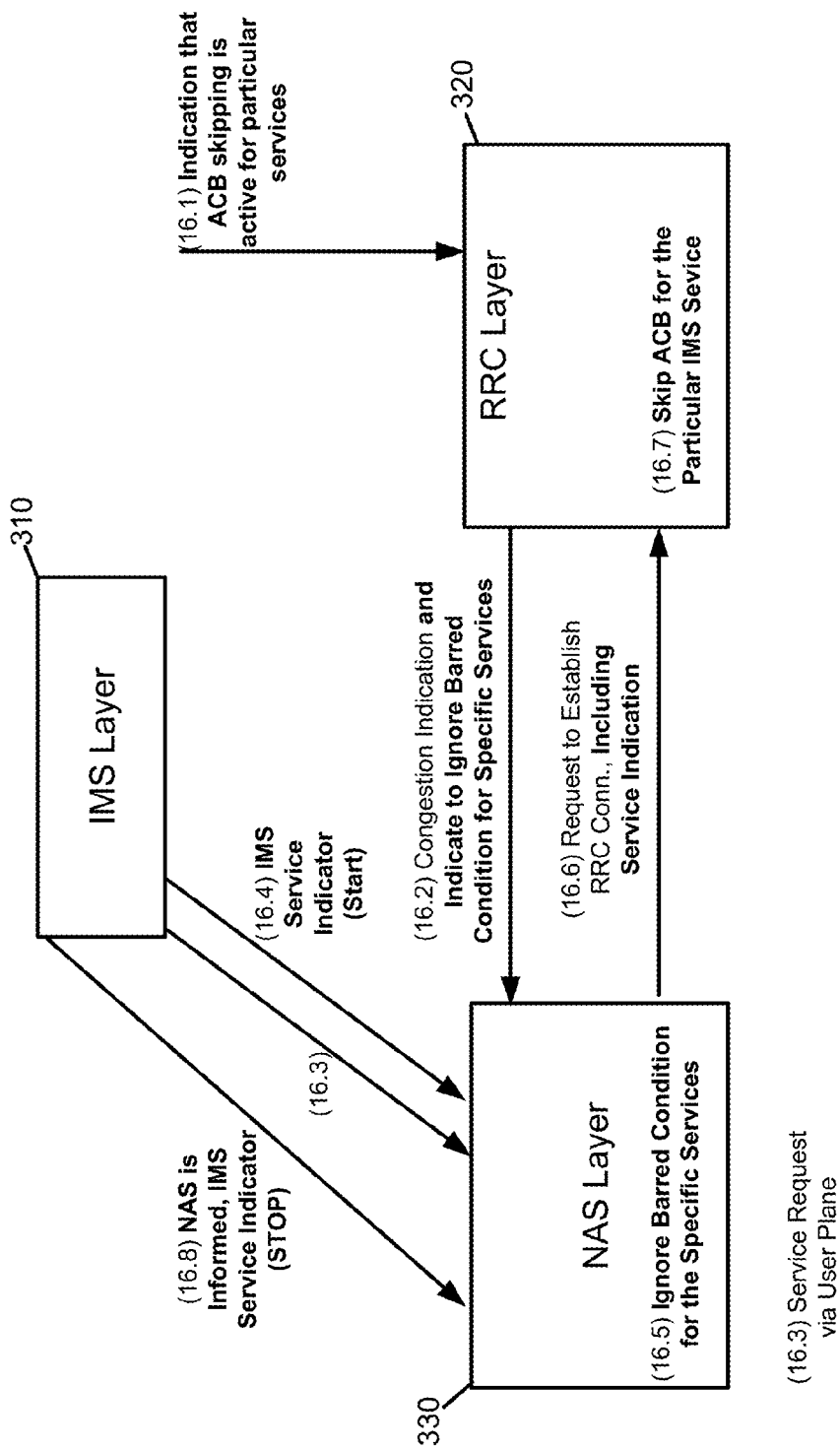

FIGS. 14-16 are diagrams illustrating different implementations relating to operations for generating Stop and Start indications. The operations of FIGS. 14-16 will be described with respect to communications between IMS layer 310, RRC layer 320, and NAS layer 330. In FIGS. 14-16, operations indicated in bold font may represent non-standard communications and/or processes that are associated with IMS layer 310, RRC layer 320, and NAS layer 330.

In the implementation of FIG. 14, the Start and Stop indications may be transmitted from IMS layer 310 to RRC layer 320. As illustrated in FIG. 14, RRC layer 320 may receive an indication that ACB skipping is active (at 14.1, "Indication that ACB skipping is active for particular services"). As previously mentioned, the indication may be received as part of a System Information Block Type 2 message. IMS layer 310 may notify RRC layer 320 when an IMS service causes triggering of a service request procedure (at 14.2, "IMS Service Indicator (Start)"). The notification may include an indication of the service. The notification may function as the Start indicator. If ACB skipping is active for the service, RRC layer 320 may stop the barring timer (timer T303). RRC layer 320 may also notify NAS layer 330 that congestion alleviation is active (at 14.3, "Congestion Alleviation Notification"). NAS layer 330 may receive a corresponding IMS request for transmission (at 14.4, "Service Request via User Plane"). NAS layer 330 may request, to RRC layer 320, establishment of an RRC connection (at 14.5, "Request to Establish RRC Conn."). RRC layer 320, when ACB skipping is active for the particular IMS service, may perform ACB skipping for the service (at 14.6, "Skip ACB for the Particular IMS Service"). Upon triggering of ACB skipping, RRC layer 320 may reset the barring timer (timer T303). IMS layer 310 may notify RRC layer 320 of completion of the IMS service (at 14.7, "IMS Service Indicator (Stop)"). The notification may function as the Stop Indication. At this point, RRC layer 320 may resume the performance of ACB checks for future RRC Connection Establishment procedures.

In the implementation of FIG. 15, the Start and Stop indications may be transmitted from IMS layer 310 to NAS layer 330. The Start and Stop indications may be forwarded, by NAS layer 330, to RRC layer 320, with each request to establish an RRC connection.

As illustrated in FIG. 15, RRC layer 320 may receive an indication that ACB skipping is active (at 15.1, "Indication that ACB skipping is active for particular services"). As previously mentioned, the indication may be received as part of a SIB2 message and may indicate the particular service(s) types for which ACB skipping applies. RRC layer 320 may notify NAS layer 330 of a congestion condition. The notification may also include an indication to ignore ACB for particular services (i.e., ignore the barring for certain services) that were received as part of the ACB skipping message (at 15.2, "Congestion Indication and Indicate to Ignore Barred Condition for Specific Services"). In other words, when there is a potential service block due to ACB, a failure notification may be sent from RRC layer 320 to NAS layer 330 and, when ACB skipping is active, a notification indicating that NAS layer 330 should ignore ACB for particular service types may also be sent. In some implementations, the congestion indication (at 15.2) may not be associated with a specific list of services. In this case, NAS layer 330 may ignore the barred condition for any service that may be subject to ACB skipping.

NAS layer 330 may receive, from IMS layer 310, an IMS request (at 15.3, "Service Request via User Plane"). IMS layer 310 may also provide NAS layer 330 with an indication of the service type (at 15.4, "IMS Service Indicator (Start)"). The indication of the service type may function as the Start indicator. In one implementation, communication 15.3 may be made through the BC/RABM (radio access bearer manager) and communication 15.4 may be direct communication between IMS layer 310 and NAS layer 330, such as via an AT command. When the service (provided at 15.4) matches the service corresponding to the notification, indicating that NAS layer 330 should ignore ACB for particular services (provided at 15.2), NAS layer 330 may ignore ACB for the particular services (at 15.5, "Ignore Barred Condition for the Specific Services"). NAS layer 330 may transmit a request, to RRC layer 320, for an establishment of an RRC connection for the service request. The request may also include an indication of the service (at 15.6, "Request to Establish RRC Conn., Including Service Indication (Start)"). RRC layer 320, when ACB skipping is active for the particular IMS service, may perform ACB skipping for the service (at 15.7, "Skip ACB for the Particular IMS Service") by establishing the requested RRC connection. When the IMS service is complete, IMS layer 310 may notify NAS layer 330 (at 15.8, "NAS is Informed, IMS Service Indicator (Stop)"), which may notify RRC layer 320 (at 15.9, "NAS Informs RRC, IMS Service Indicator (Stop)"). In this manner, the Stop indication may be forwarded, from IMS layer 310, to RRC layer 320.

In the implementation of FIG. 16, the Start indication may be transmitted from IMS layer 310 to NAS layer 330, and then from NAS layer 330 to RRC layer 320. The Stop indication may be transmitted from IMS layer 310 to NAS layer 330. The Stop indication may only be needed in NAS layer 330 (not RRC layer 320), as the service request may always be initiated by NAS layer 330.

As illustrated in FIG. 16, RRC layer 320 may receive an indication that ACB skipping is active (at 16.1, "Indication that ACB skipping is active"). As previously mentioned, the indication may be received as part of a SIB2 message and may indicate the particular service(s) for which ACB skipping applies. RRC layer 320 may notify NAS layer 330 of a congestion condition. The notification may also include an indication to ignore ACB (i.e., ignore the barring for certain services) for particular services that were received as part of the ACB skipping message (at 16.2, "Congestion Indication and Indicate to Ignore Barred Condition for Specific Services"). In other words, when there is a potential service block due to ACB, a failure notification may be sent from RRC layer 320 to NAS layer 330 and, when ACB skipping is active, a notification indicating that NAS layer 330 should ignore ACB for particular services may also be sent. In some implementations, the congestion indication (at 16.2) may not be associated with a specific list of services. In this case, NAS layer 330 may ignore the barred condition for any service that may be subject to ACB skipping.

NAS layer 330 may receive, from IMS layer 310, an IMS request (at 16.3, "Service Request via User Plane"). IMS layer 310 may also provide NAS layer 330 with an indication of the service (at 16.4, "IMS Service Indicator (Start)"). The indication of the service may function as the Start indicator. In one implementation, communication 16.3 may be made through the BC/RABM and communication 16.4 may be direct communication between IMS layer 310 and NAS layer 330, such as via an AT command. When the service (provided at 16.4) matches the service corresponding to the notification, indicating that NAS layer 330 should ignore ACB for particular services (provided at 16.2), NAS layer 330 may ignore ACB for the particular services (at 16.5, "Ignore Barred Condition for the Specific Services"). NAS layer 330 may transmit a request, to RRC layer 320, for an establishment of an RRC connection for the service request. The request may also include an indication of the service (at 16.6, "Request to Establish RRC Conn., Including Service Indication"). In this manner, IMS requests may each be forwarded by NAS layer 330 to RRC layer 320 to establish an RRC Connection until an IMS service indicator (STOP) is received by NAS layer 330 from IMS layer 310. RRC layer 320, when ACB skipping is active for the particular IMS service, may perform ACB skipping for the service (at 16.7, "Skip ACB for the Particular IMS Service") by establishing the requested RRC connection. When the IMS service is complete, IMS layer 310 may notify NAS layer 330 (at 16.8, "NAS is Informed, IMS Service Indicator (Stop)"). In this implementation, because NAS layer 330 is responsible for initiating the request to the RRC to establish an RRC connection for IMS services, there is no need to propagate the Stop indication to RRC layer 320.

FIG. 17 is a diagram of example components of a device 1700. Some of the devices illustrated in FIGS. 1, 3-12, and 14-16 may include one or more devices 1700. Device 1700 may include bus 1710, processor 1720, memory 1730, input component 1740, output component 1750, and communication interface 1760. In another implementation, device 1700 may include additional, fewer, different, or differently arranged components.

Bus 1710 may include one or more communication paths that permit communication among the components of device 1700. Processor 1720 may include processing circuitry, such as a processor, microprocessor, or processing logic that may interpret and execute instructions. Memory 1730 may include any type of dynamic storage device that may store information and instructions for execution by processor 1720, and/or any type of non-volatile storage device that may store information for use by processor 1720.

Input component 1740 may include a mechanism that permits an operator to input information to device 1700, such as a keyboard, a keypad, a button, a switch, etc. Output component 1750 may include a mechanism that outputs information to the operator, such as a display, a speaker, one or more light emitting diodes (LEDs), etc.

Communication interface 1760 may include any transceiver-like mechanism that enables device 1700 to communicate with other devices and/or systems. For example, communication interface 1760 may include an Ethernet interface, an optical interface, a coaxial interface, or the like. Communication interface 1760 may include a wireless communication device, such as an infrared (IR) receiver, a Bluetooth® radio, a WiFi radio, a cellular radio, or the like. The wireless communication device may be coupled to an external device, such as a remote control, a wireless keyboard, a mobile telephone, etc. In some embodiments, device 1700 may include more than one communication interface 1760. For instance, device 1700 may include an optical interface and an Ethernet interface.

Device 1700 may perform certain operations described above. Device 1700 may perform these operations in response to processor 1720 executing software instructions stored in a computer-readable medium, such as memory 1730. A computer-readable medium may be defined as a non-transitory memory device. A memory device may include space within a single physical memory device or spread across multiple physical memory devices. The software instructions may be read into memory 1730 from another computer-readable medium or from another device. The software instructions stored in memory 1730 may cause processor 1720 to perform processes described herein. Alternatively, hardwired circuitry may be used in place of or in combination with software instructions to implement processes described herein. Thus, implementations described herein are not limited to any specific combination of hardware circuitry and software.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while series of blocks have been described with regard to FIG. 2, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain portions of the invention may be implemented as "logic" that performs one or more functions. This logic may include hardware, such as an ASIC or a FPGA, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. User Equipment (UE) comprising:
a non-transitory computer-readable medium containing program instructions; and
processing circuitry to execute the program instructions to implement a Non Access Stratum (NAS) layer to:
receive, from an upper layer relative to the NAS layer, a request for transmission, for a particular service type, that is originated by the UE;
receive an indication, from a Radio Resource Control (RRC) layer of the UE, that access to a cell, associated with the UE, is barred;
bypass the indication that the access to the cell is barred, when the particular service type matches a predetermined set of service types, the bypassing including:
requesting that the RRC layer establish an RRC connection for the service request, and
notifying the RRC layer that the request to establish the RRC connection corresponds to the particular service type; and
receive an indication, from an Internet Protocol (IP) multimedia (IMS) layer, that the particular service type is being stopped.

2. The UE of claim 1, wherein the request for transmission includes an Internet Protocol Multimedia (IMS) request or a Short Message Service (SMS) request.

3. The UE of claim 1, wherein the processing circuitry is further to execute the program instructions to:
implement the RRC layer to:
receive an indication, from a network, relating to a state of skipping of access class barring; and
establish the RRC connection, based on the request from the NAS layer, when the state of the skipping of access class barring indicates that skipping of access class barring is active for the particular service type.

4. The UE of claim 3, wherein the RRC layer is further to:
bar the establishment of the RRC connection when the state of the ACB skipping indicates that ACB skipping is not active for the particular service type.

5. The UE of claim 1, wherein the predetermined set of service types include at least one of:
Multimedia Telephony (MMTel) video,
MMTel voice,
MMTel Short Message Service (SMS), and
SMS over an SG or S102 interface.

6. The UE of claim 1, wherein the request for transmission is received from an Internet Protocol (IP) multimedia (IMS) layer of the UE.

7. The UE of claim 1, wherein the request for transmission is received from a Short Message Service (SMS) layer.

8. The UE of claim 3, wherein the indication, from the network, relating to the state of the skipping of access class barring, includes a System Information Block Type 2 (SIB2) message that includes one or more fields to indicate the access class barring skipping state for various services.

9. The UE of claim 1, wherein the notification is based on setting an RRC establishment cause or call type.

10. The UE of claim 1, wherein the request for transmission is communicated from an Internet Protocol (IP) multimedia (IMS) layer to the NAS layer via an AT command.

11. A method comprising:
receiving, by User Equipment (UE) and from a network, an Access Class Barring (ACB) indication that a cell is barred due to congestion;
receiving, by a Radio Resource Control (RRC) layer of the UE and from the network, an indication that ACB should be bypassed for one or more particular services that are originated by the UE;
providing, to a Non Access Stratum (NAS) layer of the UE and from an application layer of the UE, identification of a service that is being originated by the UE;
receiving, by the RRC layer and from the NAS layer, a request for the establishment of a radio connection for the service;
receiving, by the RRC layer, the provided identification of the service;
establishing, by the RRC layer and with the network, the radio connection for the service, despite the indication of ACB, when the identification of the service, as received by the RRC layer, matches the one or more particular services associated with the indication that ACB should be bypassed; and
providing, from an Internet Protocol (IP) multimedia (IMS) layer and to the NAS layer, an indication of when the service has stopped.

12. The method of claim 11, wherein the service includes a Multimedia Telephony (MMTel) video call, MMTel voice call, or MMTel SMS.

13. The method of claim 11, wherein the application layer includes an Internet Protocol (IP) multimedia layer.

14. The method of claim 11, wherein the service includes a Short Message Service (SMS) service over an SG or S102 interface, and the application layer includes an SMS layer.

15. The method of claim 11, wherein the indication from the network, that ACB should be bypassed, is received as a System Information Block Type 2 (SIB2) message that includes one or more fields to indicate the one or more particular services that should be bypassed.

16. The method of claim 11, wherein the providing of the identification of the service is performed via an AT command.

17. User Equipment (UE) comprising:
a non-transitory memory device storing a plurality of processor-executable instructions; and
a processor configured to execute the processor-executable instructions, wherein executing the processor-executable instructions causes the processor to:
receive, from a cellular network, an Access Class Barring (ACB) indication that a cell is barred due to congestion;
receive, by a Radio Resource Control (RRC) layer of the UE and from the network, an indication that ACB should be bypassed for one or more particular services that are originated by the UE;
provide, to a Non Access Stratum (NAS) layer of the UE and from an application layer of the UE, identification of a service that is being originated by the UE;

receive, by the RRC layer and from the NAS layer, a request for the establishment of a radio connection for the service;

receive, by the RRC layer, the provided identification of the service;

establish, by the RRC layer and with the network, the radio connection for the service, when the identification of the service, as received by the RRC layer, matches the one or more particular services associated with the indication that ACB should be bypassed;

provide, from an Internet Protocol (IP) multimedia (IMS) layer and to the NAS layer, an indication of when the service has stopped.

18. The UE of claim 17, wherein the service includes a Multimedia Telephony (MMTel) video call, MMTel voice call, or MMTel SMS.

19. The UE of claim 18, wherein the application layer includes an Internet Protocol (IP) multimedia layer.

20. The UE of claim 17, wherein the service includes a Short Message Service (SMS) service over an SG or S102 interface, and the application layer includes an SMS layer.

21. The UE of claim 20, wherein the indication from the network, that ACB should be bypassed, is received as a System Information Block Type 2 (SIB2) message that includes one or more Boolean valued fields to indicate the one or more particular services that should be bypassed.

22. The UE of claim 17, wherein the providing of the identification of the service is performed via an AT command.

* * * * *